United States Patent
Zarkowskyj

(10) Patent No.: US 9,682,763 B2
(45) Date of Patent: Jun. 20, 2017

(54) APPARATUS AND METHODS FOR ATTACHING PANELS TO SUPPORT STRUCTURES

(71) Applicant: The Boeing Company, Chicago, IL (US)

(72) Inventor: Peter J. Zarkowskyj, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 132 days.

(21) Appl. No.: 14/710,237

(22) Filed: May 12, 2015

(65) Prior Publication Data
US 2016/0332715 A1    Nov. 17, 2016

(51) Int. Cl.
| | |
|---|---|
| *B64C 1/06* | (2006.01) |
| *F16M 13/02* | (2006.01) |
| *B64C 1/14* | (2006.01) |
| *B64C 1/12* | (2006.01) |
| *F16C 11/10* | (2006.01) |

(52) U.S. Cl.
CPC .............. *B64C 1/066* (2013.01); *B64C 1/069* (2013.01); *B64C 1/12* (2013.01); *B64C 1/1484* (2013.01); *F16M 13/02* (2013.01); *F16C 11/10* (2013.01)

(58) Field of Classification Search
CPC ............ B64C 1/066; B64C 1/069; B64C 1/12
See application file for complete search history.

(56) References Cited

U.S. PATENT DOCUMENTS

| | | |
|---|---|---|
| 7,578,478 B2 | 8/2009 | Guard et al. |
| 2006/0118676 A1 | 6/2006 | Novak et al. |
| 2013/0320140 A1 | 12/2013 | Cheung et al. |
| 2014/0197278 A1 | 7/2014 | Cheung et al. |

*Primary Examiner* — Nicholas McFall
(74) *Attorney, Agent, or Firm* — Ostrager Chong Flaherty & Broitman P.C.

(57) ABSTRACT

Apparatus and methods for attaching a panel to a supporting structure. Hinged assemblies having open and closed hinge states are attached to at least two elements of the supporting structure. A multiplicity of clips are bonded to the back surface of the panel. The clips are hooked on respective hinged assemblies while the latter are in their respective open hinge states, whereby the panel is coupled to the at least two elements of the supporting structure with loose fit engagement. Then the hinged assemblies are manipulated so that their respective states transform from open to closed, whereby the panel is attached to the at least two elements of the supporting structure with positive snap fit engagement. No fasteners or tooling are required when installing or removing the panels.

19 Claims, 19 Drawing Sheets

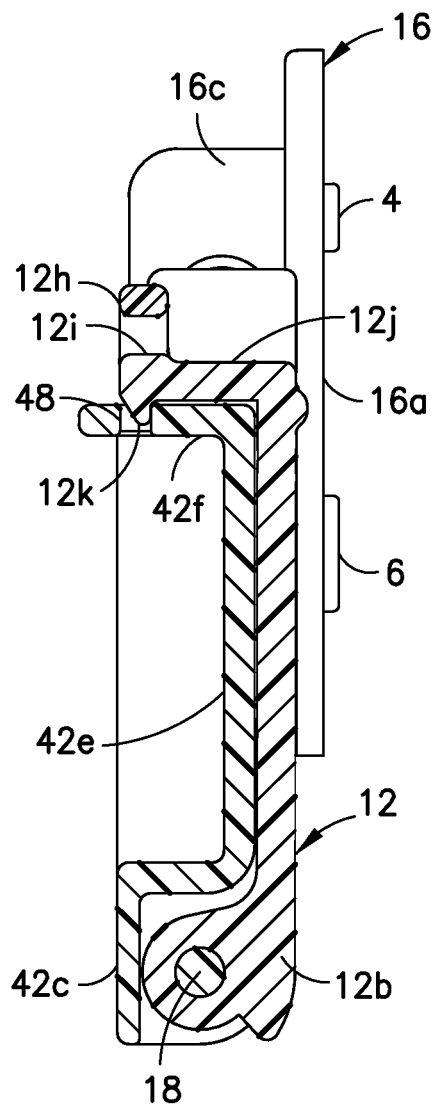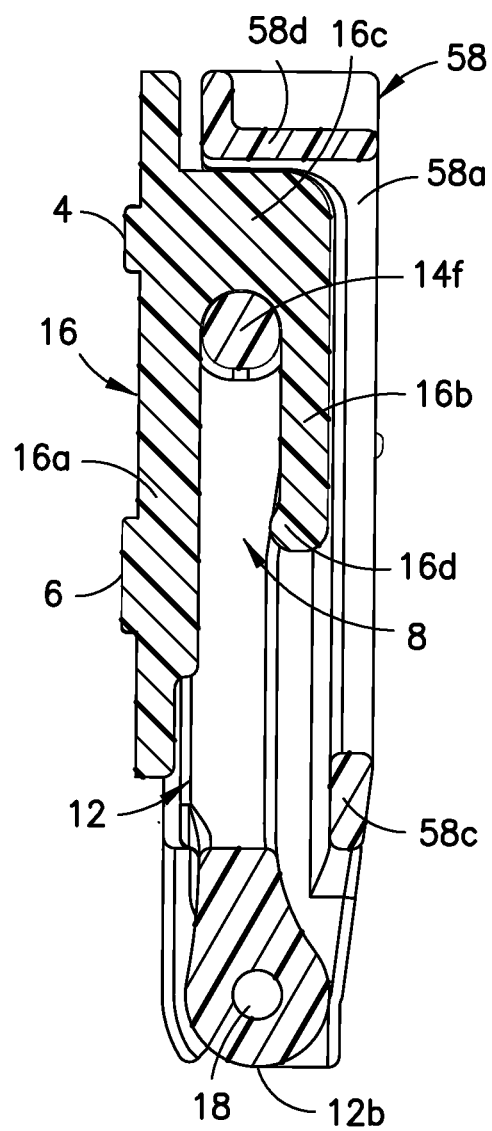
FIG. 12
FIG. 15 ns, and which are
affixed (e.g., by riveting) to the frames of the aircraft.
APPARATUS AND METHODS FOR ATTACHING PANELS TO SUPPORT STRUCTURES

TECHNICAL FIELD

This disclosure generally relates to wall installation systems, such as for aircraft interior sidewalls. More particularly, this disclosure relates to apparatus and methods for installing wall panels that require minimal tooling, and which also facilitate later removal of wall sections while minimizing damage to the wall structure.

BACKGROUND

Fabrication of a commercial aircraft typically comprises building an airframe (referred to herein as a "fuselage") comprising a series of curved transverse ribs (referred to herein as "frames") and longitudinal stiffeners. A frame may comprise a multiplicity of members connected end to end or may be fabricated as one piece. The outboard side of the frames is covered with an outboard wall or skin (referred to herein as an "outer skin") made of aluminum, carbon fiber-reinforced composite material or other suitable material. The inboard side of the frames in the cabin area may similarly be partially covered with a series of curved sidewall panels that are attached to the inside of the frames, typically by screws or other fasteners. The interior sidewall panels are typically made of polymer material, and can include window frames and other structure that forms a part of the finished aircraft. Along the outboard wall and between the frames, other aircraft components such as insulation, electrical conduits, ventilation ducting, control mechanisms, and the like may be installed. Once wiring, insulation and other internal wall components are installed between the frames and inside the outboard wall, the interior sidewall panels are attached to cover the internal wall components with a durable covering that provides a pleasing appearance.

The interior sidewall panels of commercial passenger aircraft are typically configured as a number of generally curved vertical panels that extend between the floor and storage bin of the aircraft in a side-to-side manner along either interior wall of the aircraft. A decorative vertical trim strip (referred to herein as a "spline") may be inserted between the edges of adjacent panels to cover any gap and provide a pleasing appearance to the cabin. Insulation is typically located behind the sidewall trim panels to reduce the amount of noise and vibration resulting from such external sources as the aircraft engines or turbulent air flow to the cabin. This noise and vibration is further reduced by mounting the sidewall panels against rubber shock absorbers which are also known as "shock mounts", and which are affixed (e.g., by riveting) to the frames of the aircraft. However, the sidewall panels must be held securely against the shock mounts so that any vibration of the airframe does not cause these panels to vibrate against the frame, shock mounts, and other interior components.

Typical aircraft sidewall panels require specialized tooling and hardware for installation, such as special screws, washers, screw drivers, panel installation support aids, shims, etc. In one common arrangement, a sidewall installation involves eight fasteners that attach to their respective frame mounting brackets. Some sidewall systems include mounting hardware (e.g., screws) that is shared between adjacent panels. Other sidewall systems avoid screws and fasteners by using keyways, slotted brackets and the like.

With all of the elements of a typical sidewall installation, it can be a challenge to get the sidewall panel properly aligned rotationally, vertically and horizontally and then install all of the fasteners. For example, it is desirable to accurately adjust for the proper sidewall panel-to-center of window alignment, which may involve individually adjusting each one of multiple frame brackets, and centering the sidewall panel to align with the window before final fastening of each mounting screw. Even systems that include keyholes and brackets can involve individual adjustment of multiple brackets during installation. Consequently, typical sidewall installations involve more than one skilled worker and a significant amount of time to properly adjust the sidewall panels and install all of the fasteners. Adjusting and fastening several parts by hand is time-consuming. Moreover, even after such installations, there can be issues with gaps, wrinkles and puckers in the sidewall panel, due to internal stresses induced during the installation process and other irregularities.

Typical sidewall installations can also present challenges when removal of panels is desired. Certain aircraft maintenance and repair operations can involve the removal of one or more sidewall panels in an aircraft, in order to allow access to electrical, mechanical and other components inside the wall. With typical fastener-attached wall panels, removal of an existing panel presents a higher than desired probability of damage to the panel (perhaps resulting in costly replacement), and a higher than desired likelihood of misalignment or other defect when the panel is replaced. Panel systems that have shared fasteners between adjacent panels present other possible problems.

The present disclosure is directed toward addressing one or more of the aforementioned issues.

SUMMARY

The subject matter disclosed in detail below is directed to apparatus and methods for attaching a panel to a supporting structure. Hinged assemblies having open and closed hinge states are attached to at least two elements of the supporting structure. A multiplicity of clips are bonded to the back surface of the panel. The clips are hooked on respective hinged assemblies while the latter are in their respective open hinge states, whereby the panel is coupled to the at least two elements of the supporting structure with loose fit engagement. Then the hinged assemblies are manipulated so that their respective states transform from open to closed, whereby the panel is attached to the at least two elements of the supporting structure with positive snap fit engagement. No fasteners or tooling are required when installing or removing the panels.

In accordance with some embodiments, the assembled system comprises a bracket which is affixed to an aircraft fuselage via shock mounts, wherein two retainers are coupled in a hinged relationship to the bracket via a hinge pin. A plurality of hooks (referred to herein as "panel clips") bonded to a back surface of an aircraft interior sidewall panel may be used to locate the retainers, which may then be swung into a closed position and latched. Once the retainers are latched, the panel clips are constrained by the attachment apparatus. No fasteners are required when installing or removing the sidewall panels.

This new design eliminates fasteners during sidewall installation, provides the installer with a clear visible view that each sidewall clip is properly retained, and provides a positive latching. One person may install or remove a sidewall panel. No tools are required. Each sidewall clip may be locked into position independently, enabling a quick and simple installation method for airplane sidewalls by a single technician.

One aspect of the subject matter disclosed in detail below is a method for attaching a panel to a supporting structure, comprising: attaching a first hinged assembly having open and closed hinge states to a first element of the supporting structure; attaching a second hinged assembly having open and closed hinge states to a second element of the supporting structure; bonding first and second clips to first and second portions of a panel; hooking the first and second clips on the first and second hinged assemblies respectively while the first and second hinged assemblies are in their respective open hinge states, whereby the first and second portions of the panel are respectively coupled to the first and second elements of the supporting structure with loose fit engagement; and manipulating the first and second hinged assemblies so that their respective states transform from their respective open hinge states to their respective closed hinge states, whereby the first and second portions of the panel are respectively attached to the first and second elements of the supporting structure with positive snap fit engagement. The foregoing method may further comprise: attaching a third hinged assembly having open and closed hinge states to the first element of the supporting structure; attaching a fourth hinged assembly having open and closed hinge states to the second element of the supporting structure; bonding third and fourth clips to third and fourth portions of the panel; hooking the third and fourth clips of the third and fourth hinged assemblies respectively while the third and fourth hinged assemblies are in their respective open hinge states, whereby the third and fourth portions of the panel are respectively coupled to the first and second elements of the supporting structure with loose fit engagement; and manipulating the third and fourth hinged assemblies so that their respective states transform from their respective open hinge states to their respective closed hinge states, whereby the third and fourth portions of the panel are respectively attached to the first and second elements of the supporting structure with positive snap fit engagement.

In accordance with some embodiments, hooking the first clip on the first hinged assembly comprises hooking the first clip on a pivotable portion of the first hinged assembly, and manipulating the first hinged assembly comprises causing the pivotable portion of the first hinged assembly to pivot from a first angular position whereat the first hinged assembly is in its open hinge state to a second angular position whereat the first hinged assembly is in its closed hinge state. The pivotable portion of the first hinged assembly may be latched to a fixed portion of the first hinged assembly when the first hinged assembly is in its second angular position. In some implementations, a projection on a flexible portion of the pivotable portion of the first hinged assembly snaps into an empty space behind an edge of a fixed portion of the first hinged assembly when the pivotable portion of the first hinged assembly reaches its second angular position.

The above-described method has particular application when the first and second elements are respective interior frames of an aircraft fuselage and the panel is an interior sidewall panel.

Another aspect of the subject matter disclosed in detail below is a method for attaching a panel to a supporting structure, comprising: attaching a bracket of a first assembly to a first element of the supporting structure, the first assembly having a retainer which is pivotable relative to the bracket of the first assembly between a first angular position whereat the retainer is not latched to the bracket and a second angular position whereat the retainer is latched to the bracket; bonding a first clip to a back surface of a panel; hooking the first clip on a catch bar of the retainer of the first assembly while the retainer of the first assembly is in its first angular position; and rotating the retainer of the first assembly from its first angular position to its second angular position while the first clip remains hooked on the catch bar of the retainer of the first assembly. This method may further comprise: attaching a bracket of a second assembly to a second element of the supporting structure, the second assembly having a retainer which is pivotable relative to the bracket of the second assembly between a first angular position whereat the retainer is not latched to the bracket and a second angular position whereat the retainer is latched to the bracket; bonding a second clip to the back surface of the panel; hooking the second clip on a catch bar of the retainer of the second assembly while the retainer of the second assembly is in its first angular position; and rotating the retainer of the second assembly from its first angular position to its second angular position while the second clip remains hooked on the catch bar of the retainer of the second assembly. Again this methodology has particular application when the first and second elements of the supporting structure are respective interior frames of an aircraft fuselage and the panel is an interior sidewall panel.

A further aspect of the disclosed subject matter is an assembly comprising: a hinge pin comprising first and second axial portions; a bracket comprising a first portion that supports the first axial portion of the hinge pin and a second portion connected to the first portion and disposed at a distance from the hinge pin; and a first retainer comprising a first proximal portion which is pivotably coupled to the second axial portion of the hinge pin, and first and second distal portions which move along respective arcs when the first retainer is rotated about the hinge pin, wherein the first distal portion of the first retainer comprises a catch bar and the second distal portion of the first retainer comprises a latch feature which latches to the second portion of the bracket when the first retainer rotates to a predetermined angular position relative to the bracket. The latch feature of the first retainer may comprise a projection which overrides the second portion of the bracket and then enters an empty space bounded by an edge of the second portion of the bracket while the first retainer is rotating into the predetermined angular position relative to the bracket. The second portion of the bracket may comprise a slot configured to receive the projection of the first retainer or a projection configured to engage the projection of the first retainer. The second distal portion of the first retainer may further comprise an unlatch feature capable of lifting the projection of the first retainer out of the empty space in response to a force being applied to the unlatch feature while the first retainer is latched to the bracket.

In accordance with one embodiment, the hinge pin of the assembly described in the first sentence of the preceding paragraph further comprises a third axial portion, the first axial portion of the hinge pin being disposed between the second and third axial portions, and the first retainer further comprises a second proximal portion which is pivotably coupled to the third axial portion of the hinge pin.

In accordance with another embodiment, the hinge pin further comprises a third axial portions, the first axial portion of the hinge pin being disposed between the second and third axial portions, the assembly further comprising: a second retainer comprising a proximal portion which is pivotably coupled to the third axial portion of the hinge pin, and first and second distal portions which move along respective arcs when the second retainer is rotated about the hinge pin, wherein the first distal portion of the second retainer comprises a catch bar and the second distal portion of the second retainer comprises a latch feature which latches to the second portion of the bracket when the second retainer rotates to a predetermined angular position relative to the bracket.

Yet another aspect of the subject matter disclosed in detail below is a system comprising: a support structure comprising first and second elements; a wall supported by the first and second elements of the supporting structure; a first assembly comprising a first bracket attached to the first element of the supporting structure and a first retainer which is pivotably coupled to the first bracket, the first retainer being rotatable between a first angular position at which the first retainer is not latched to the first bracket and a second angular position at which the first retainer is latched to the first bracket; a second assembly comprising a second bracket attached to the second element of the supporting structure and a second retainer which is pivotably coupled to the second bracket, the second retainer being rotatable between a first angular position at which the second retainer is not latched to the second bracket and a second angular position at which the second retainer is latched to the second bracket; a panel; first and second clips attached to the panel and respectively coupled to the first and second retainers, wherein the first and second elements of the supporting structure are disposed between the wall and the panel. For example, the first and second elements of the supporting structure may be respective interior frames of an aircraft fuselage, the wall may be an outer skin of the aircraft fuselage, and the panel may be an interior sidewall panel.

In accordance with some embodiments of the system, the first retainer comprises a first catch bar, the second retainer comprises a second catch bar, the first clip is hooked on the first catch bar, and the second clip is hooked on the second catch bar. In addition, the first bracket may further comprise a first locating element which blocks upward movement of the first clip when the first retainer is latched to the first bracket, and the second bracket may further comprise a second locating element which blocks upward movement of the second clip when the second retainer is latched to the second bracket.

In accordance with further embodiments of the system, the first retainer comprises a first projection which overrides a portion of the first bracket and then enters a first empty space bounded by an edge of the portion of the first bracket as the first retainer rotates into an angular position corresponding to a latched state of the first retainer; and the second retainer comprises a second projection which overrides a portion of the second bracket and then enters a second empty space bounded by an edge of the portion of the second bracket as the second retainer rotates into an angular position corresponding to a latched state of the second retainer. The first retainer may further comprise a first unlatch feature capable of lifting the first projection out of the first empty space in response to a force being applied to the first unlatch feature while the first retainer is in its latched state; and the second retainer may further comprise a second unlatch feature capable of lifting the second projection out of the second empty space in response to a force being applied to the second unlatch feature while the second retainer is in its latched state.

Other aspects of apparatus and methods for snap-fit installation of panels on supporting structure are disclosed and claimed below.

BRIEF DESCRIPTION OF THE DRAWINGS

The features, functions and advantages discussed in the preceding section can be achieved independently in various embodiments or may be combined in yet other embodiments. Various embodiments will be hereinafter described with reference to drawings for the purpose of illustrating the above-described and other aspects.

FIG. 12 is a diagram representing a sectional view of a portion of the floating snap latch assembly depicted in FIGS. 10 and 11, the section being taken along a vertical plane that intersects a bracket and a portion of a retainer that includes an unlatch feature.

FIG. 15 is a diagram representing a sectional view of a portion of the locating snap latch assembly depicted in FIG. 14, the section being taken along a vertical plane that intersects a bracket, a retainer and a panel clip.

Reference will hereinafter be made to the drawings in which similar elements in different drawings bear the same reference numerals.

DETAILED DESCRIPTION

Illustrative embodiments are described below as they might be employed in a sidewall installation system for an aircraft. However, it should be appreciated that the apparatus and methods described below have wider application and may be used to attach panels to supporting structure in other types of vehicles or in buildings. In the interest of clarity, not all features of an actual implementation are described in this specification. A technician skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The particular embodiments described in detail below provide a highly integrated aircraft having a fuselage comprising a series of transverse interior frames and an outer skin disposed along the outboard side of the airframe. The system presented herein uses positive snap fit engagement to enable interior non-structural components such as interior sidewall panels to be easily assembled, installed, and removed. In the case of aircraft assembly, an interior sidewall panel system can be easily assembled and installed inside an aircraft cabin between the lower dado panel and the upper storage bins without using special tools. The interior sidewall panel system can also be rapidly disassembled for maintenance and reconfiguration without special tools.

For purposes of this disclosure, positive snap fit engagement may be achieved using a mechanical joint system wherein the panel-to-fuselage attachment is accomplished with locating and locking features (i.e., constraint features) that are homogeneous with or integral to one or the other of the components being joined. Such joining may involve flexible locking features to move for engagement with the mating part, followed by a return of the locking feature toward its original position to accomplish the interference required to attach the components together. Locator features, the second type of constraint feature, are inflexible, providing strength and stability to the attachment.

Figure 1:
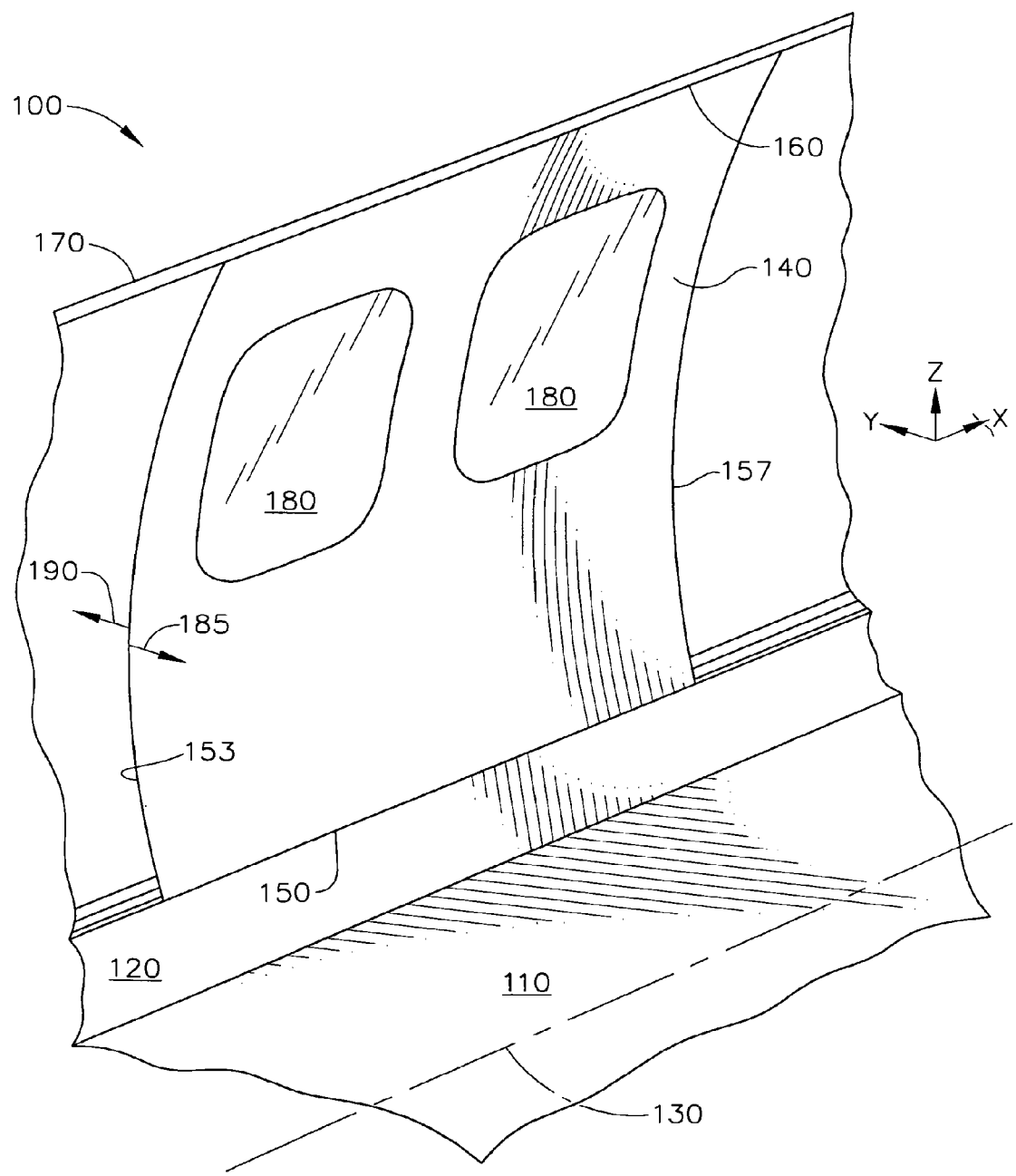
FIG. 1 is a diagram representing an isometric view of a typical sidewall panel and its orientation with respect to the interior of an aircraft cabin.

FIG. 1 shows an isometric view of a portion of an interior of an aircraft cabin 100. The aircraft cabin 100 comprises a floor 110, from which a dado panel 120 extends upwardly. A longitudinal axis of the aircraft cabin 100 is indicated by line 130. The dado panel 120 extends longitudinally along the walls of the aircraft cabin 100 in an orientation parallel with the longitudinal axis 130, and in general it provides a means for equalizing pressure within the cabin and for providing interior air to the cargo compartments below (not shown). One or more sidewall panels 140 (only one of which is shown for ease of illustration) may extend upwardly from the dado panel 120. The sidewall panel 140 may have a curved structure that is pre-shaped to conform to the curvature of the aircraft frames (not shown in FIG. 1) to which it is attached, so that its inboard surface 185 may have a generally concave aspect and its outboard surface 190 may have a generally convex aspect. The sidewall panel 140 may be mounted on and supported by the dado panel 120 along a lower edge 150 of the sidewall panel 140 and connected along an upper edge 160 of the sidewall panel 140 to an upper structure 170 of the cabin structure which also extends longitudinally along the length of the cabin. Still referring to FIG. 1, a typical sidewall panel 140 has two panel openings 180, which may provide a convenient size for a sidewall panel 140 that may be installed without undue hardship by the installer, but the sidewall panel 140 may have one or more than two panel openings in other embodiments. The sidewall panel 140 depicted in FIG. 1 has a left edge 153 and a right edge 157.

Figure 2:
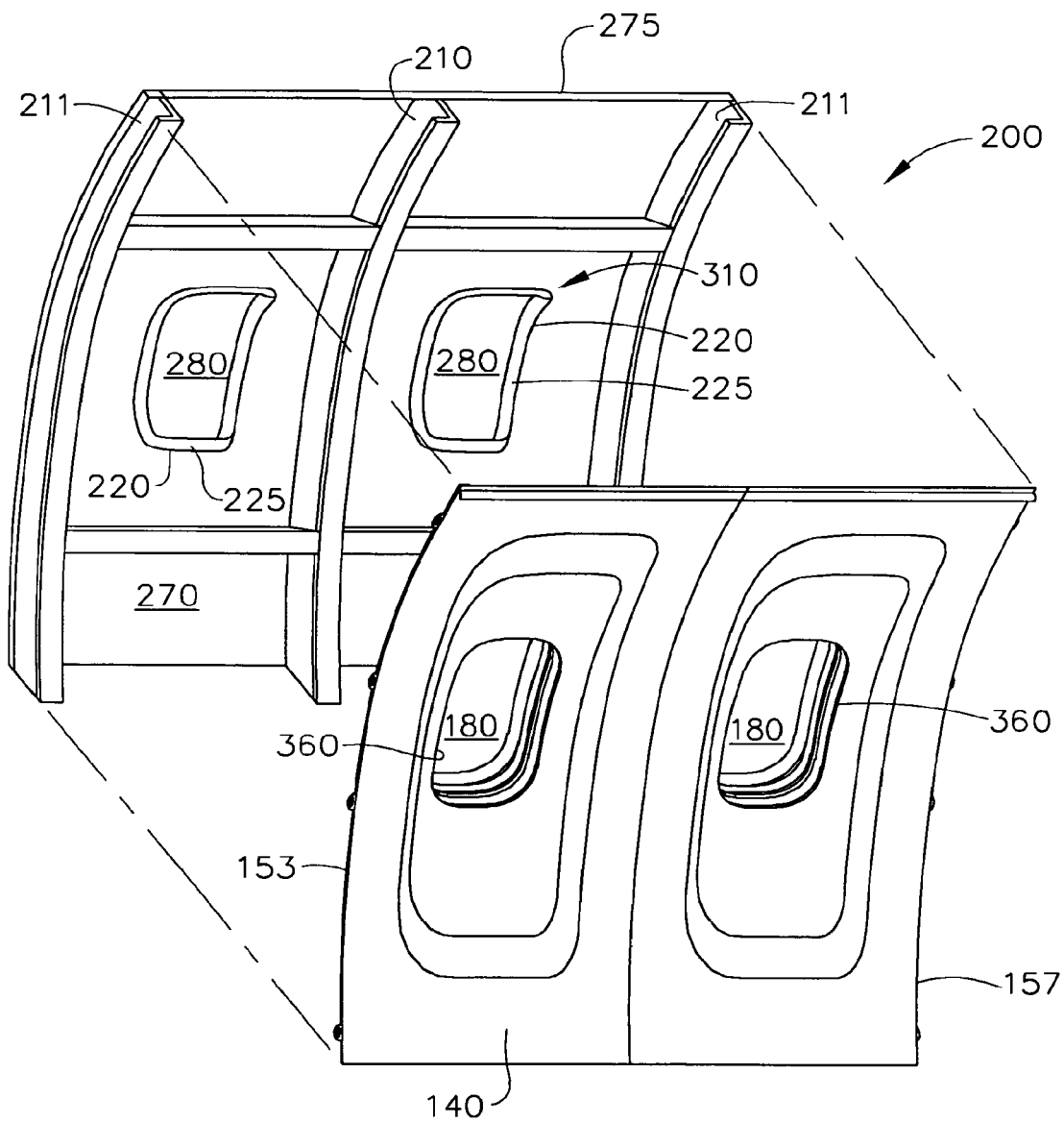
FIG. 2 is a diagram representing an isometric view of a typical sidewall panel and its relationship to the frames of an airframe.

Referring now to FIG. 2, a typical sidewall panel assembly 200 may include a sidewall panel 140 with two panel openings 180 therein to accommodate respective window reveals 360. The sidewall panel 140 may span vertical frames 210, 211, wherein the number of vertical frames 210, 211 is one more than the number of panel openings 180. The outermost vertical frames 211 may be respectively positioned outboard of the left edge 153 and outboard of the right edge 157 of the sidewall panel 140, with the vertical frame 210 between the outermost frames 211 being positioned between two adjacent panel openings 180. Each frame 210, 211 may typically have a cross-sectional aspect resembling an "L", an "I", or a "J".

The panel openings 180 in sidewall panel 140 may be configured to oppose similar structural openings 280 in an outer skin 275 which covers the aircraft frame. An outer window assembly 310 may be inserted within each structural opening 280 and held in place to the outer skin 275 by a window forging 220 with a first flange 225 around its circumference extending in an inboard direction perpendicular to the outer skin 275 and a second flange (not visible in FIG. 2) around its outboard extent that extends inwardly into the opening 280.

Figure 3:
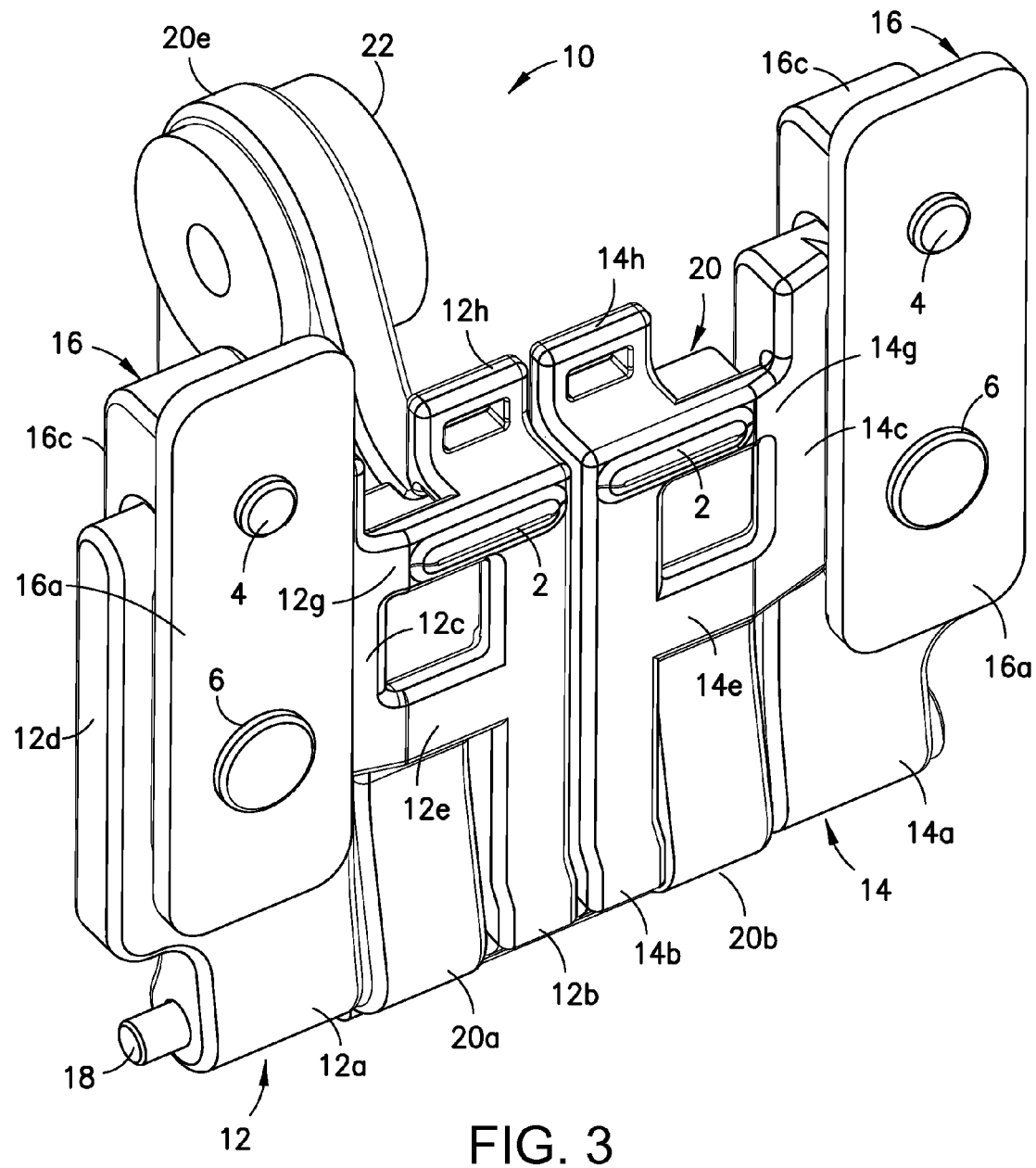
FIG. 3 is a diagram representing an isometric view of a floating snap latch assembly in accordance with a first embodiment. This floating snap latch assembly comprises a pair of retainers which are shown in respective latched states with respective panel clips hooked thereon.

FIGS. 3-6 are diagrams representing various views of a floating snap latch assembly 10 in accordance with a first embodiment. As best seen in FIG. 3, floating snap latch assembly 10 comprises a bracket 20 and a pair of retainers 12 and 14 which are hinged (i.e., pivotably coupled) to bracket 20 by means of a hinge pin 18. The bracket 20 and retainers 12, 14 may be advantageously made of injection-molded plastic material. The bracket 20 may be attached to a supporting structure such as a frame (also not shown). Such attachment may be realized by way of one or more shock mounts, which means that bracket 20 and the supporting structure need not be in direct contact for attachment purposes.

The retainers 12 and 14 are shown in FIG. 3 in respective latched states with respective clips 16 hooked thereon. Each panel clip 16 comprises a flange 16a, a flexible member 16b (not shown in FIG. 3) and a base 16c which is integrally formed with and connects flange 16a and flexible member 16b. The flange 16a of each panel clip 16 may be bonded or otherwise attached to a panel (not shown in FIG. 3). In the implementation shown, a small circular button 4 and a large circular button 6 project out of the surface of flange 16a. These buttons are used to locate the panel clip 16 accurately with respect to a panel. The panel has indentations (not shown in the drawings) in its rear surface into which buttons 4 and 6 on the panel clip 16 locate.

The hinge pin 18 shown in FIG. 3 may be considered as having first through sixth axial portions disposed in sequence along its length (not visible or otherwise indicated in FIG. 3), with the second axial portion being between the first and third axial portions, the third axial portion being between the second and fourth axial portions, and so forth. For the purpose of describing the assembly depicted in FIG. 3, the convention will be adopted that the first through sixth axial portions of hinge pin 18 are disposed from left to right as seen from the vantage point given in FIG. 3.

Figure 4:
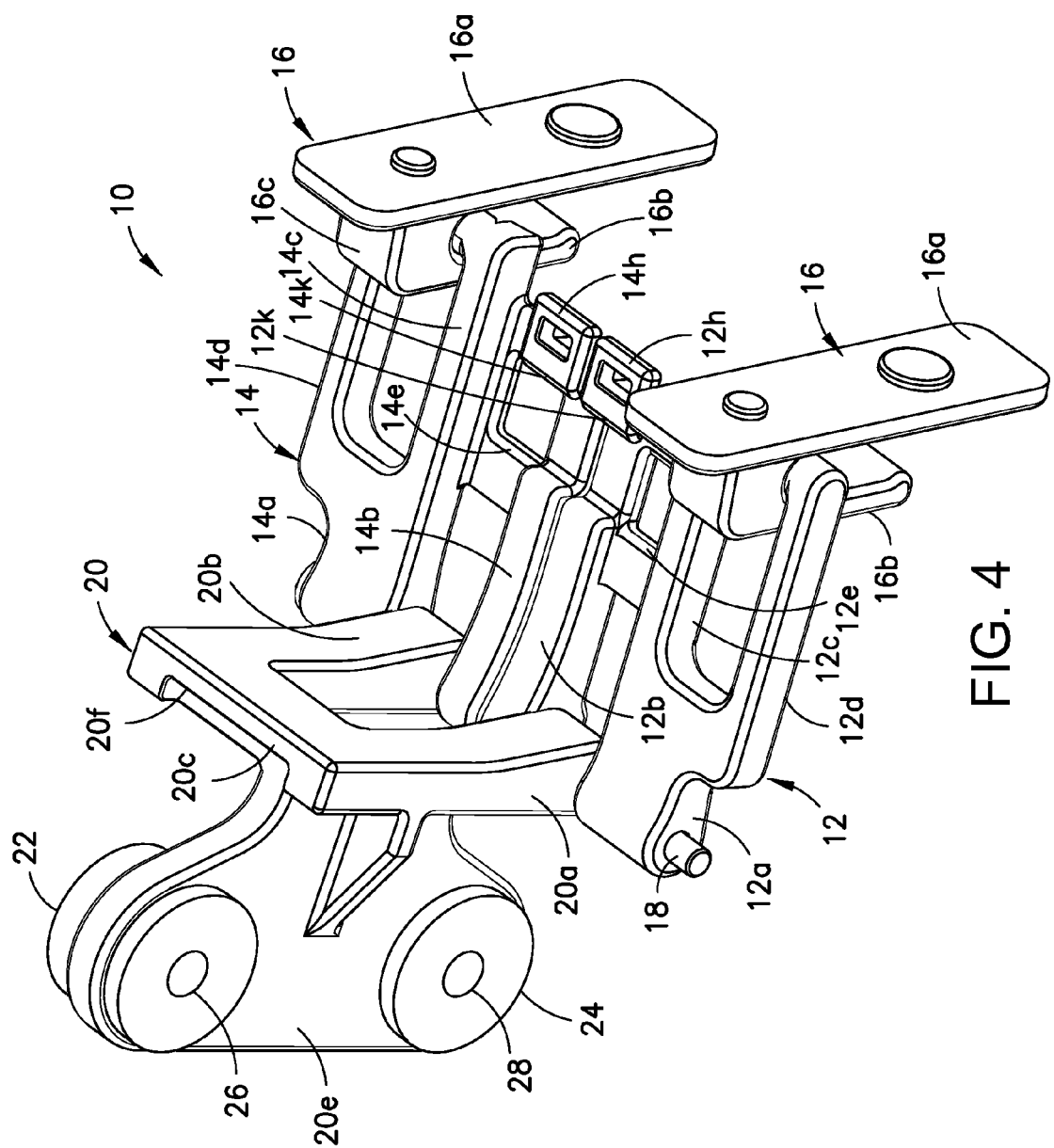
FIG. 4 is a diagram representing another isometric view of the floating snap latch assembly depicted in FIG. 3, but showing the retainers in respective unlatched states with respective panel clips hooked thereon.

Adopting the aforementioned convention, in the embodiment depicted in FIG. 3, bracket 20 comprises a first side member 20a having a distal portion that is coupled to and supports the second axial portion of hinge pin 18 and a second side member 20b having a distal portion that is coupled to and supports the fifth axial portion of hinge pin 18. As best seen in FIG. 4, bracket 20 further comprises an upper cross member 20c integrally formed with and connecting upper portions of the first and second side members 20a, 20b; and a lower cross member (hidden in FIG. 3, but see 20d in FIG. 8) integrally formed with and connecting lower portions of first and second side members 20a, 20b. The cross member 20c has an edge 20f that bounds an empty space designed for receiving latching projections that are part of the retainers 12 and 14. The bracket 20 further comprises a mounting plate 20e which is integrally formed with first and second side members 20a, 20b and with upper cross member 20c.

Figure 5:
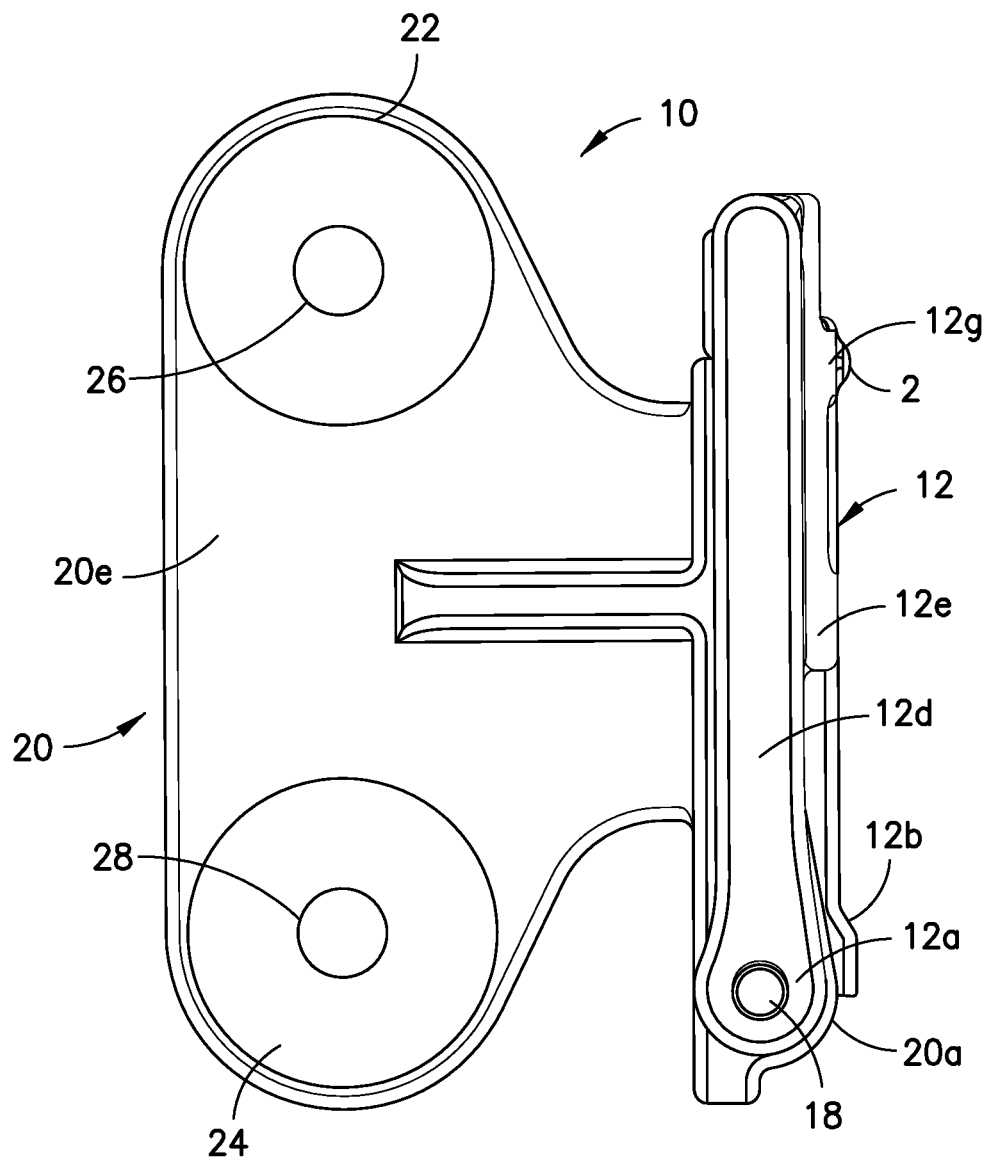
FIG. 5 is a diagram representing a side elevational view of the floating snap latch assembly depicted in FIG. 3. The panel clips have been omitted.

FIG. 5 shows a side elevational view of the floating snap latch assembly 10 depicted in FIGS. 3 and 4, but with the panel clips 16 removed. As seen in FIG. 5, the mounting plate 20e has two openings which receive respective shock mounts 22, 24. The mounting plate 20e can be attached (via shock mounts 22, 24) to a frame (not shown in FIGS. 3-5) by means of fasteners (also not shown) which pass through respective openings in the frame and respective central openings 26, 28 formed in shock mounts 22, 24. For example, if the frame has an L-shaped cross section with one sidewall, each shock mount may be attached to the frame by passing a bolt through the central opening in the shock mount and through an aligned opening in the frame sidewall and then screwing a nut onto a threaded end of the bolt in a well-known manner.

Figure 6:
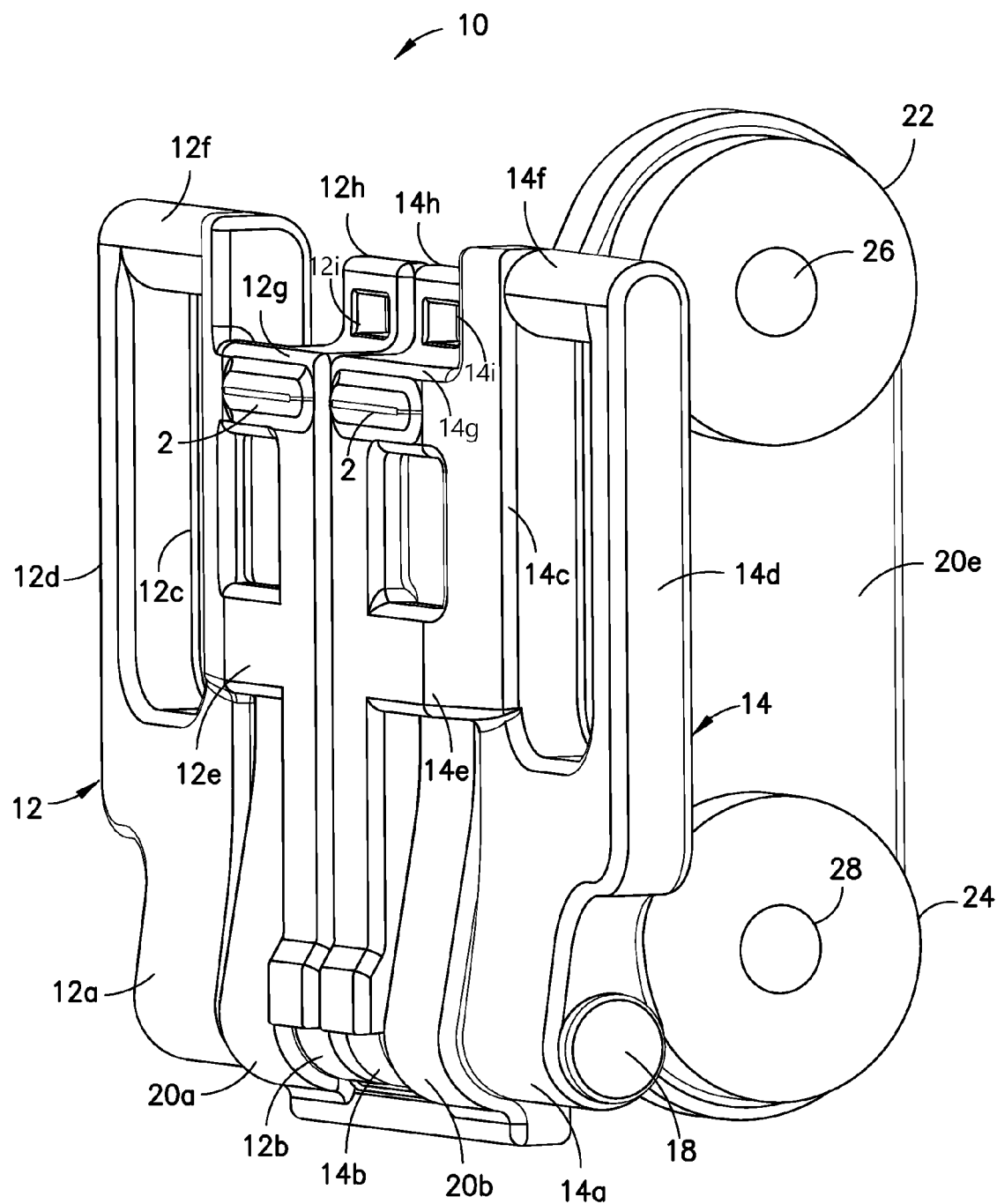
FIG. 6 is a diagram representing another isometric view of the floating snap latch assembly depicted in FIG. 3. Again the panel clips have been omitted.

As best seen in FIG. 4, the retainer 12 comprises a first portion 12a which is pivotably coupled to the first axial portion of hinge pin 18 and a second portion 12b which is pivotably coupled to the third axial portion of hinge pin 18, while the retainer 14 comprises a first portion 14a which is pivotably coupled to the sixth axial portion of hinge pin 18 and a second portion 14b which is pivotably coupled to the fourth axial portion of hinge pin 18. FIG. 4 shows retainers 12 and 14 in respective unlatched states. In the depicted embodiment, the retainer 12 further comprises arms 12c and 12d integrally formed with and projecting in parallel away from first portion 12a, while the retainer 14 further comprises arms 14c and 14d integrally formed with and projecting in parallel away from first portion 14a. As shown in FIG. 6, retainer 12 further comprises a catch bar 12f having opposing ends which are integrally formed with the distal ends of arms 12c and 12d, while retainer 14 further comprises a catch bar 14f having opposing ends which are integrally formed with the distal ends of arms 14c and 14d. Respective panel clips can be hooked onto catch bars 12f and 14f.

As further shown in FIG. 6, the arm 12c and second portion 12b of retainer 12 are integrally formed with and connected by a first cross member 12e and by a second cross member 12g, while arm 14c and second portion 14b of retainer 14 are integrally formed with and connected by a first cross member 14e and by a second cross member 14g. The second cross members 12g, 14g each have a raised feature 2 formed thereon, which raised feature helps guide a spline as it is being slid between a pair of installed panels to cover a gap between the panels. (One spline slides between two adjacent panels and covers the latches.)

In addition, the integrally formed retainers 12 and 14 further comprise respective unlatch features 12h, 14h which are designed to receive an unlatching tool, such as a flat-head screwdriver. More specifically, the unlatch features 12h, 14h have respective rectangular apertures 12i, 14i which can receive the end of the screwdriver, allowing the technician manipulating the screwdriver to apply a lifting force that will cause a latch feature (not visible in FIG. 6) to flex upward, thereby unlatching the retainer from the bracket.

Figure 7:
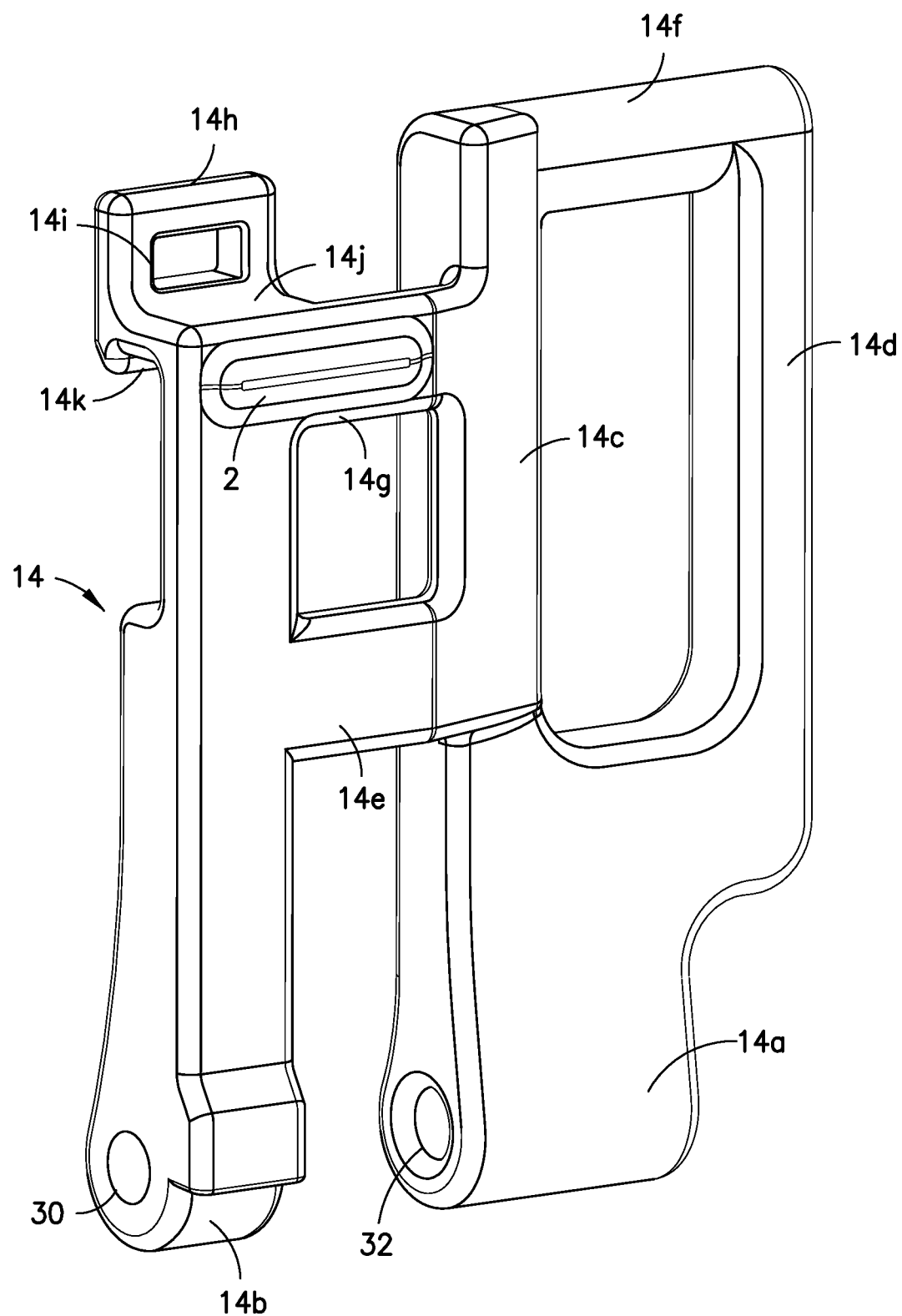
FIG. 7 is a diagram representing an isometric view of a retainer of the type included in the floating snap latch assembly depicted in FIGS. 3 through 6.

FIG. 7 shows additional structural features of retainer 14 which are not visible in FIG. 6. The other retainer 12 (seen, e.g., in FIG. 6) will have a similar structure, except that it would be a mirror image of the structure of retainer 14. As depicted in FIG. 7, the latch feature is in the form of a flexible member 14j having a downward projection 14k. The flexible member 14j is designed to spring back to a neutral position in response to being bent upward. The projection 14k is designed to latch behind an edge formed on the bracket cross member (see edge 20f formed on cross member 20c of bracket 20 shown in FIG. 4). The unlatch feature 14h is integrally formed with and projects upwardly from the flexible member 14j. As the unlatch feature 14h is lifted by the technician, the projection 14k will rise. When the projection 14k has been lifted a sufficient distance, the projection 14k will override the obstruction posed by the edge 20f (see FIG. 4), thereby enabling the technician to unlatch the retainer 14 from the bracket 20 and rotate retainer 14 to an angular position at which the retainer 14 is not latched to bracket 20. Conversely, when retainer 14 is in an unlatched state (see, e.g., FIG. 4), retainer 14 can be rotated until the projection 14k overrides cross member 20c (see FIG. 4) and then springs back and snaps into place behind the edge 20f of cross member 20c, thereby latching retainer 14 to bracket 20, as depicted in FIGS. 3 and 6. The retainer 12 can be latched and unlatched in a similar manner.

Figure 8:
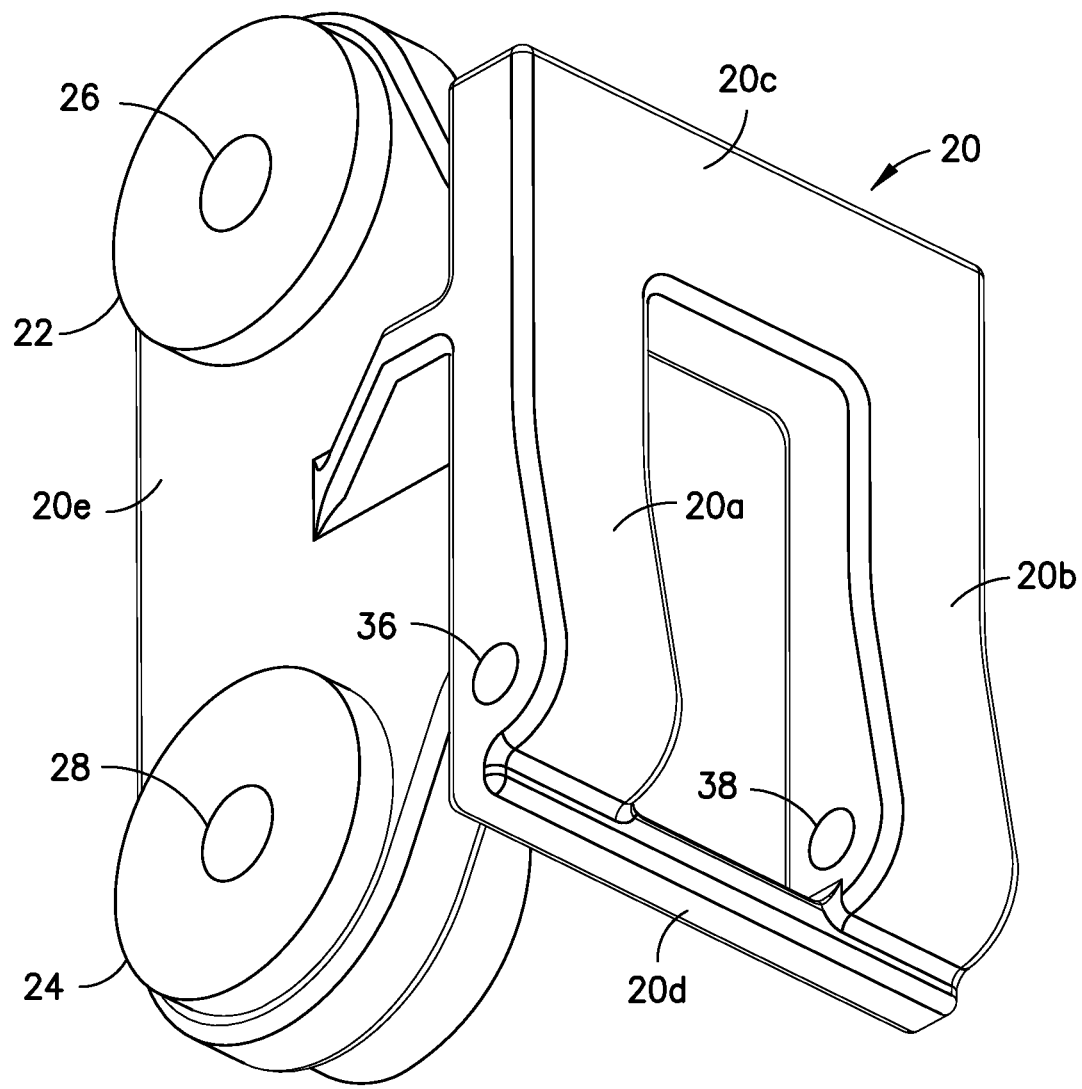
FIG. 8 is a diagram representing an isometric view of a bracket of the type included in the floating snap latch assembly depicted in FIGS. 3 through 6.

FIG. 8 shows bracket 20 of floating snap latch assembly 10 in isolation. As seen in FIG. 8, bracket 20 comprises: first and second side members 20a, 20b; upper and lower cross members 20c, 20d which are respectively connected to upper and lower portions of the first and second side members 20a, 20b; and a mounting plate 20e which is connected to first and second side members 20a, 20b and to upper cross member 20c. The lower portions of side members 20a and 20b have respective openings 36 and 38 which receive the hinge pin (not shown in FIG. 8). Advantageously, the bracket 20 may be a unitary piece of injection-molded plastic.

At least one claim appended hereto recites a bracket (e.g., bracket 20 in FIGS. 6 and 8) comprising a first portion that supports the first axial portion of a hinge pin (e.g., hinge pin 18 in FIG. 6) and a second portion connected to the first portion and disposed at a distance from the hinge pin; and a first retainer (e.g., retainer 14 in FIGS. 6 and 7) comprising a first proximal portion which is pivotably coupled to the second axial portion of the hinge pin, and first and second distal portions which move along respective arcs when the first retainer is rotated about the hinge pin. The first distal portion of the first retainer comprises a catch bar (e.g., catch bar 14f in FIG. 7) and the second distal portion of the first retainer comprises a latch feature (e.g., projection 14k in FIG. 7)) which latches to the second portion of the bracket when the first retainer rotates to a predetermined angular position relative to the bracket.

Figure 9:
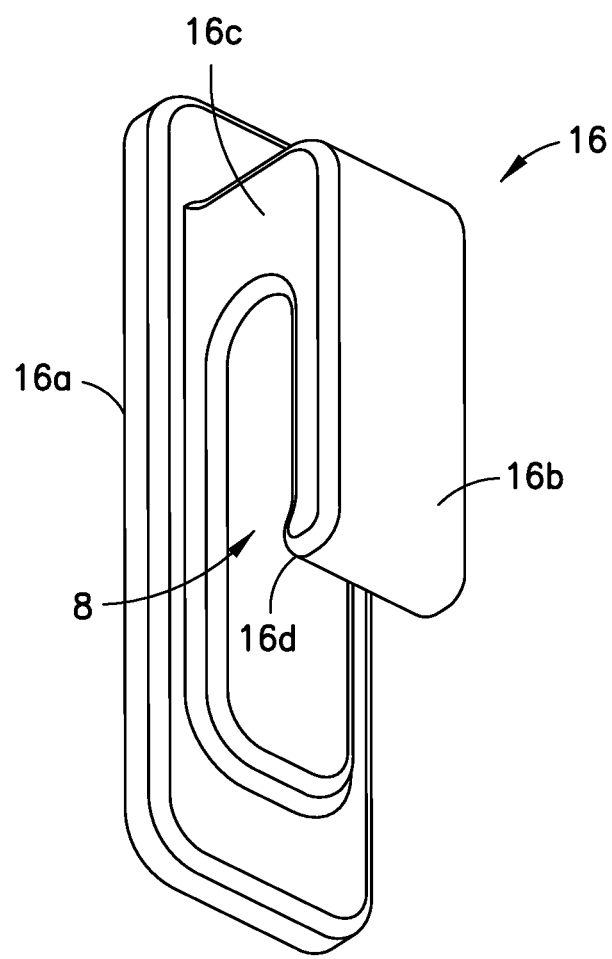
FIG. 9 is a diagram representing an isometric view of a panel clip of the type depicted in FIGS. 3 and 4.

FIG. 9 is a diagram representing an isometric view of a panel clip 16 of the type depicted in FIGS. 3 and 4. This panel clip 16 comprises a flange 16a and a flexible member 16b connected by a base 16c as previously described. A bead 16d is formed on a distal end of the flexible member 16b. Preferably the panel clip 16 is made of injection-molded plastic and the flexible member 16b is designed to flex so that bead 16d can deflect away from flange 16a when an appropriate force is applied. For example, the bead 16d may deflect away from flange 16a when the panel clip 16 is pressed with sufficient force onto a catch bar (see, e.g., catch bar 14f in FIG. 7) placed adjacent to the gap 8 which separates flange 16a and bead 16d. The applied force causes the flexible member 16b to flex and the bead 16d to move further away from flange 16a, thereby increasing the size of gap 8 to allow the catch bar to pass through, thereby hooking the panel clip 16 onto the catch bar.

Figure 10:
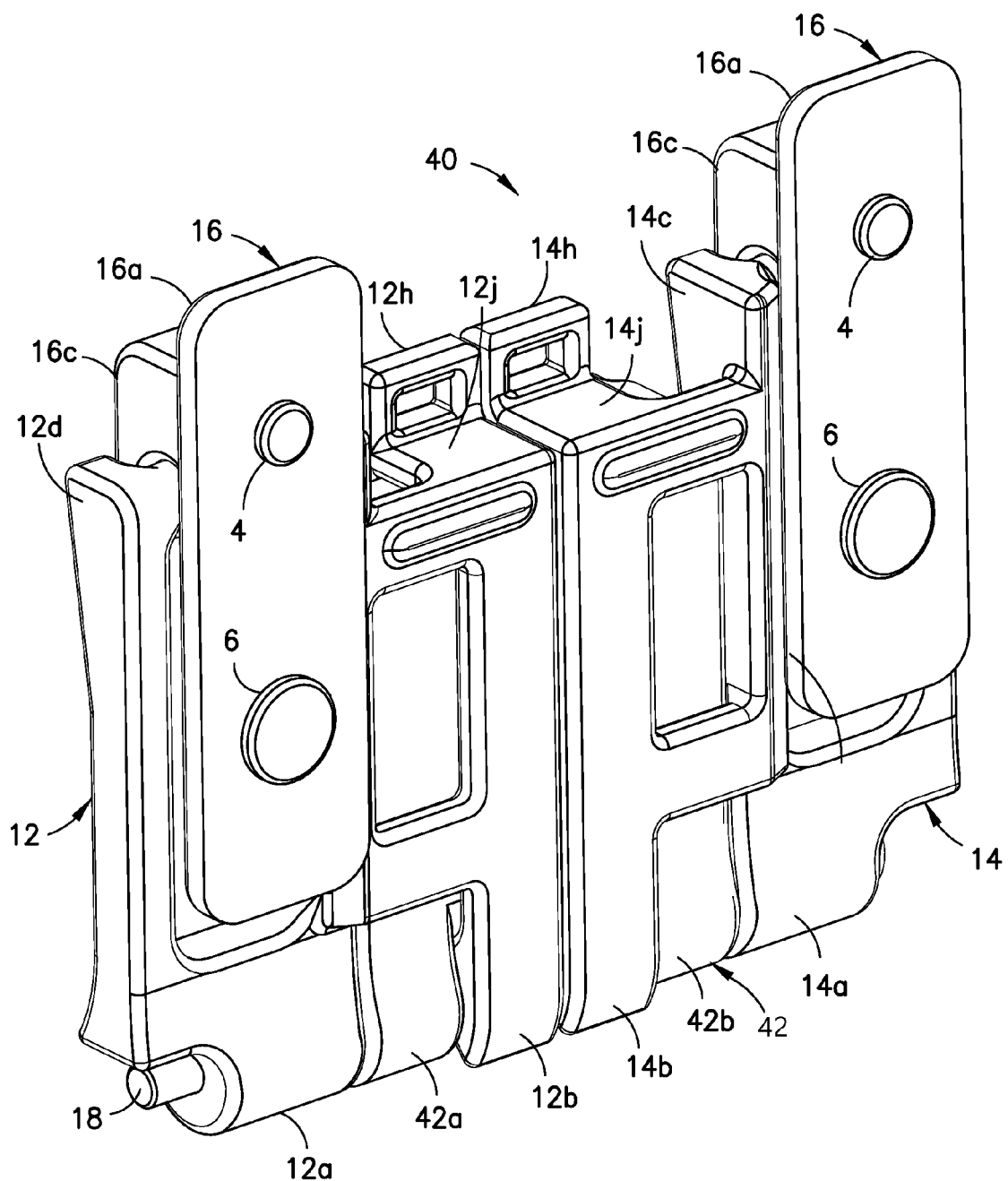
FIG. 10 is a diagram representing an isometric view of a floating snap latch assembly in accordance with a second embodiment. This floating snap latch assembly comprises a pair of retainers which are shown in respective latched states with respective panel clips hooked thereon.
Figure 11:
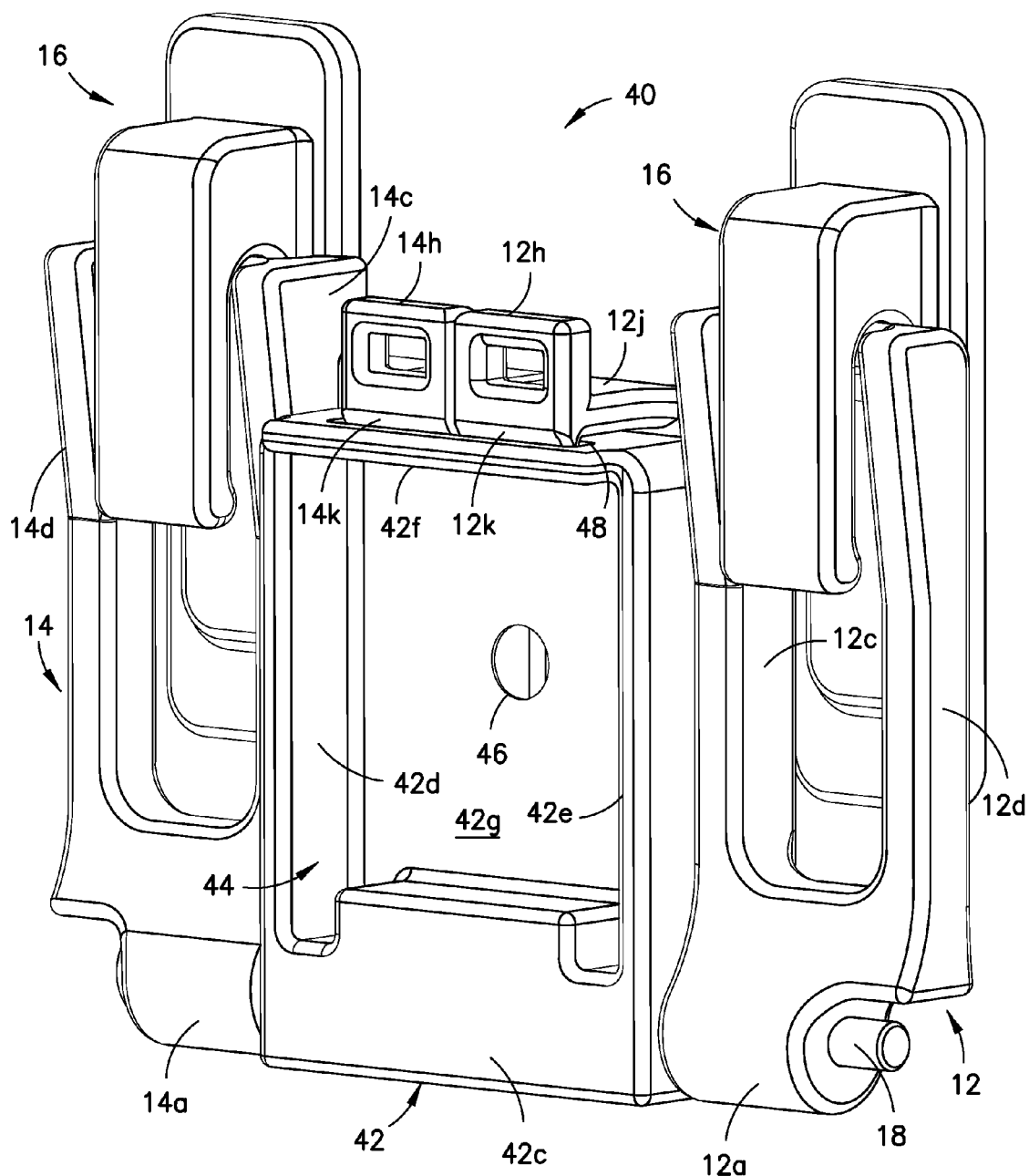
FIG. 11 is a diagram representing another isometric view of the floating snap latch assembly with panel clips depicted in FIG. 10.

FIGS. 10 and 11 are respective isometric views of a floating snap latch assembly 40 in accordance with a second embodiment. This floating snap latch assembly 40 comprises a pair of retainers 12, 14 which may have a structure similar to the structure of the retainers incorporated in floating snap latch assembly 40 described above (see, e.g., FIG. 7). Likewise the panel clips 16 may be the same as the panel clip depicted in FIG. 9.

The floating snap latch assembly 40 depicted in FIGS. 10 and 11 comprises a bracket 42 which differs from bracket 20 depicted in FIG. 8. As best seen in FIG. 11, the bracket 42 is preferably formed as a unitary piece of injection-molded plastic having a generally rectangular cavity 44 for receiving a shock mount (not shown in FIG. 11) which will be fastened to a front wall of a frame (also not shown) rather than a sidewall. The cavity 44 is formed by a bracket base 42c, sidewalls 42d, 42e, a top wall 42f, and a front wall 42g having four sides which are respectively integrally formed with and connected to bracket base 42c, sidewalls 42d, 42e, and top wall 42f. The front wall 42g has an opening 46. The fastener for attaching bracket 42 to the front wall of a frame will pass through opening 46, a central opening in a shock mount (not shown), and an opening in the front wall of the frame (not shown).

As best seen in FIG. 10, the bracket 42 further comprises base portions 42a and 42b which support a hinge pin 18. Base portions 42a and 42b are integrally formed with the bracket base 42c. Although hidden in FIG. 10, base portions 42a and 42b have respective openings which are occupied by respective axial portions of the hinge pin 18.

Figure 13:
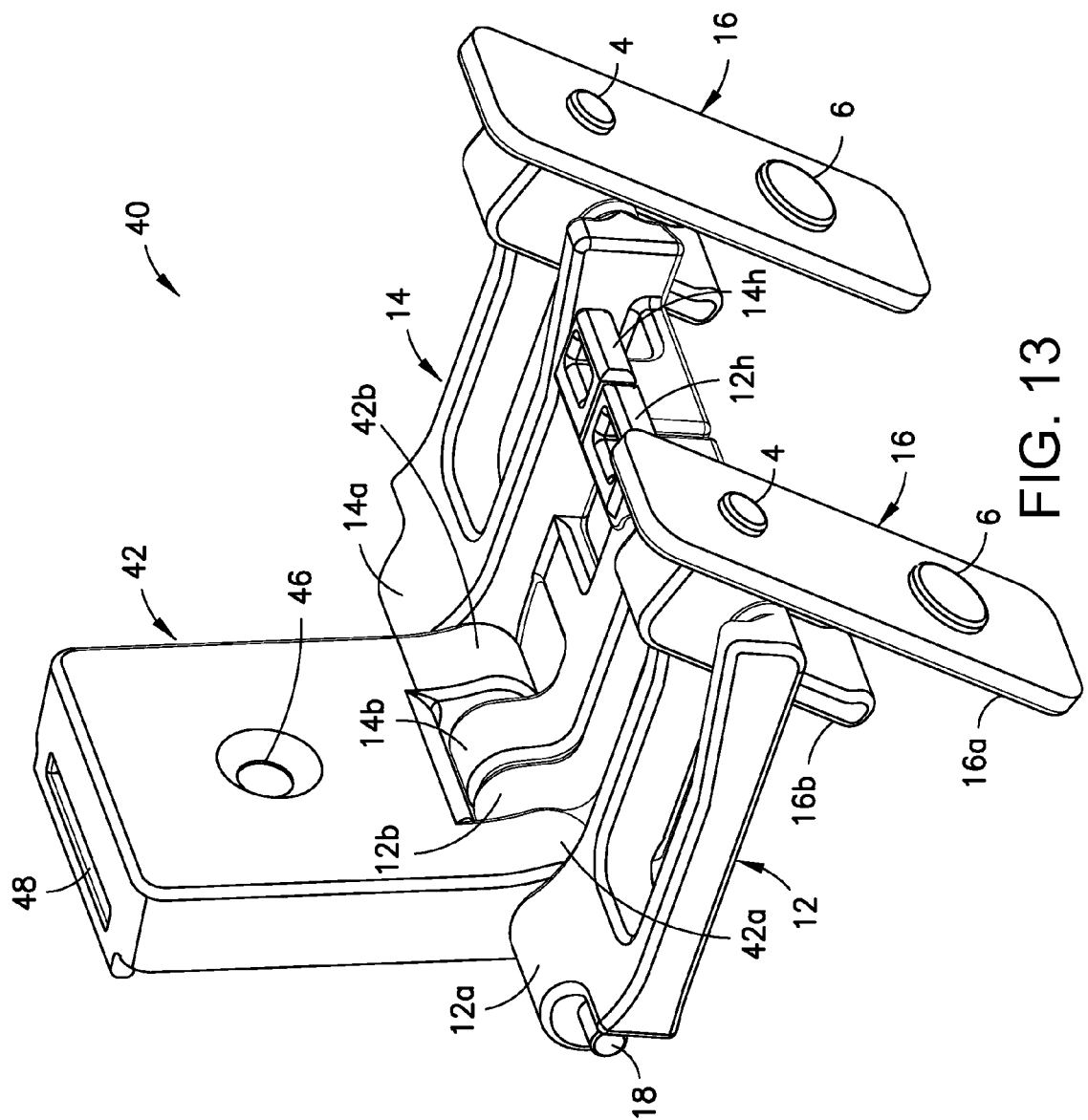
FIG. 13 is a diagram representing another isometric view of the floating snap latch assembly with panel clips depicted in FIG. 10, but showing the retainers in respective unlatched states.

As seen in FIG. 11, the top wall 42f of bracket 42 has a slot 48 which receives the respective projections 12k, 14k of retainers 12, 14. As previously described, the latch feature for each retainer 12, 14 is in the form of a respective flexible member 12j, 14j having a respective downward projection 12k, 14k. The projections 12k, 14k are designed to latch in slot 48 of bracket 42. This latching feature can be seen more clearly in the sectional view presented in FIG. 12, which shows the projection 12k of retainer 12 latched in slot 48. The retainers 12, 14 may be unlatched in the manner previously described by manipulating their respective unlatch features 12h, 14h using a tool. FIG. 13 is a diagram representing another isometric view of floating snap latch assembly 40, but showing the retainers 12, 14 in respective unlatched states.

In accordance with alternative embodiments, the bracket may be modified to include locating features (e.g., stops) which block upward movement of the panel clips, thereby holding the sidewall panel to a water line of the aircraft. Snap latch assemblies comprising brackets having such locating features are referred to herein as "locating snap latch assemblies", in contrast to the above-described "floating snap latch assemblies" which lack such locating features.

Figure 14:
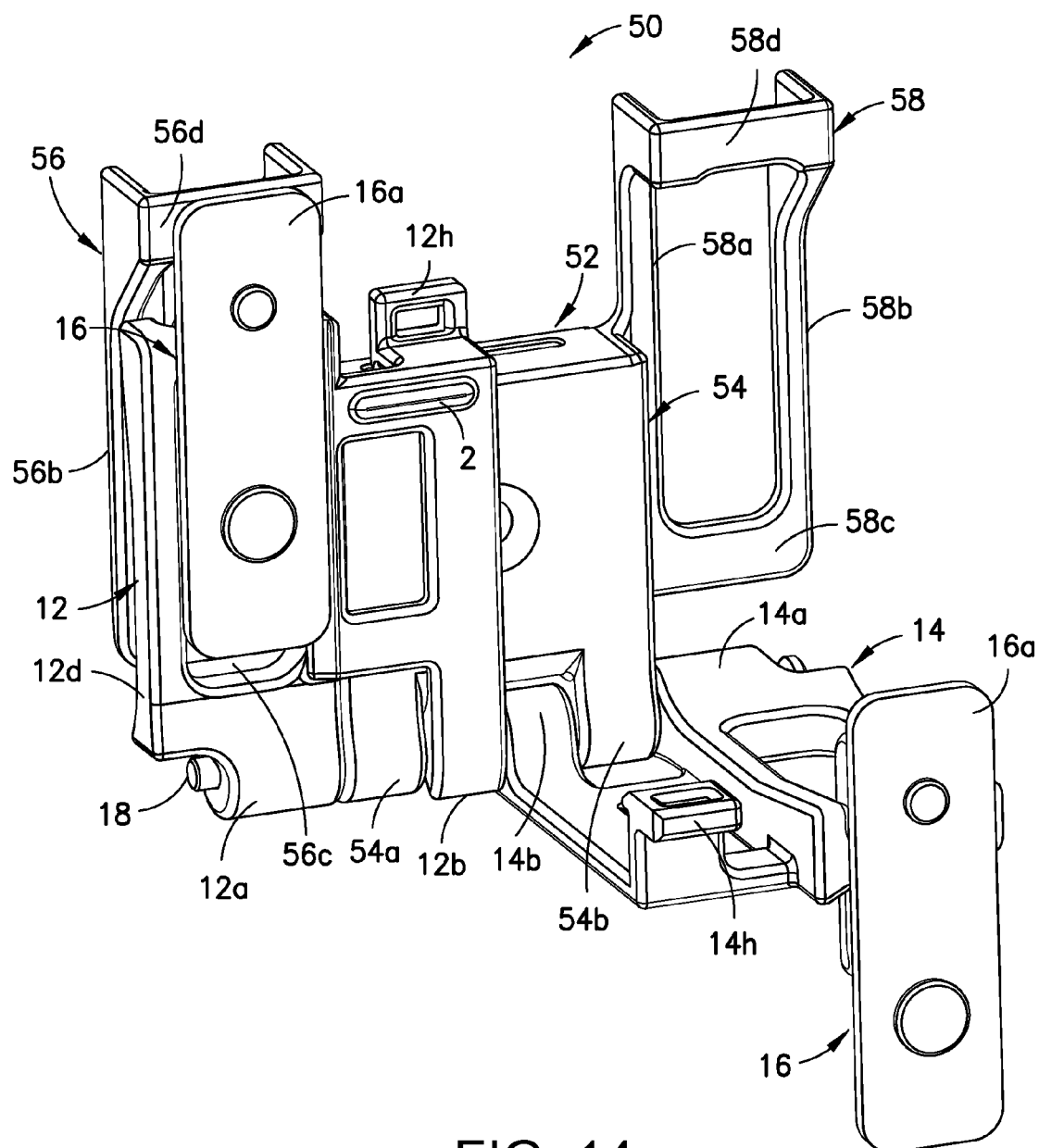
FIG. 14 is a diagram representing an isometric view of a locating snap latch assembly in accordance with a third embodiment. This locating snap latch assembly comprises a pair of retainers, one shown in its latched state and the other shown in its unlatched state in FIG. 14. Both retainers are shown with respective panel clips hooked thereon.

FIG. 14 is a diagram representing an isometric view of a locating snap latch assembly 50 in accordance with a third embodiment. This locating snap latch assembly 50 comprises a pair of retainers 12, 14, one shown in its latched state and the other shown in its unlatched state in FIG. 14. Both retainers are shown with respective panels clips 16 hooked thereon. The retainers 12, 14 of locating snap latch assembly 50 may have the same structure as retainers 12, 14 of floating snap latch assembly 40 (previously described with reference to FIGS. 10-13). Also each panel clip 16 seen in FIG. 14 may be the same as the panel clip depicted in FIG. 9.

Still referring to FIG. 14, locating snap latch assembly 50 further comprises a bracket 52 comprising a central portion 54 and a pair of locating elements 56, 58 which are integrally formed with and connected to opposing sidewalls of the central portion 54. The central portion 54 of bracket 52 may have a structure which is the same as the structure of bracket 42 depicted in FIGS. 11 and 13. More specifically, the central portion 54 (see FIG. 14) has a cavity for receiving a shock mount and further has an opening in its front wall for receiving a bolt for fastening the shock mount and bracket 52 to a front wall of a frame, as previously described with reference to FIG. 11.

As seen in FIG. 14, the locating element 56 comprises a pair of side members 56a (shown in FIG. 15), 56b, a cross member 56c integrally formed with and connecting the bottom portions of side members 56a, 56b, and a stop member 56d integrally formed with and connecting the top portions of side members 56a, 56b. As best seen in the cross-sectional view presented in FIG. 15, the stop member 56d has an L-shaped profile with a horizontal portion that confronts the base 16c of panel clip 16 with a small gap therebetween when the retainer 12 is in the latched state. In the event that the panel clip 16 moves upward while the retainer 12 is latched to the bracket 52, further upward movement of the panel clip 16 coupled to retainer 12 will be stopped when base 16c abuts the stop member 56d. Similarly, the locating element 58 comprises a pair of side members 58a, 58b, a cross member 58c integrally formed with and connecting the bottom portions of side members 58a, 58b, and a stop member 58d integrally formed with and connecting the top portions of side members 58a, 58b. The stop member 58d limits upward movement of the panel clip 16 coupled to retainer 14. The abutment of panel clips against stop members prevents the panel from moving upward beyond a specified tolerance, thereby holding the panel to a water line.

Figure 16:
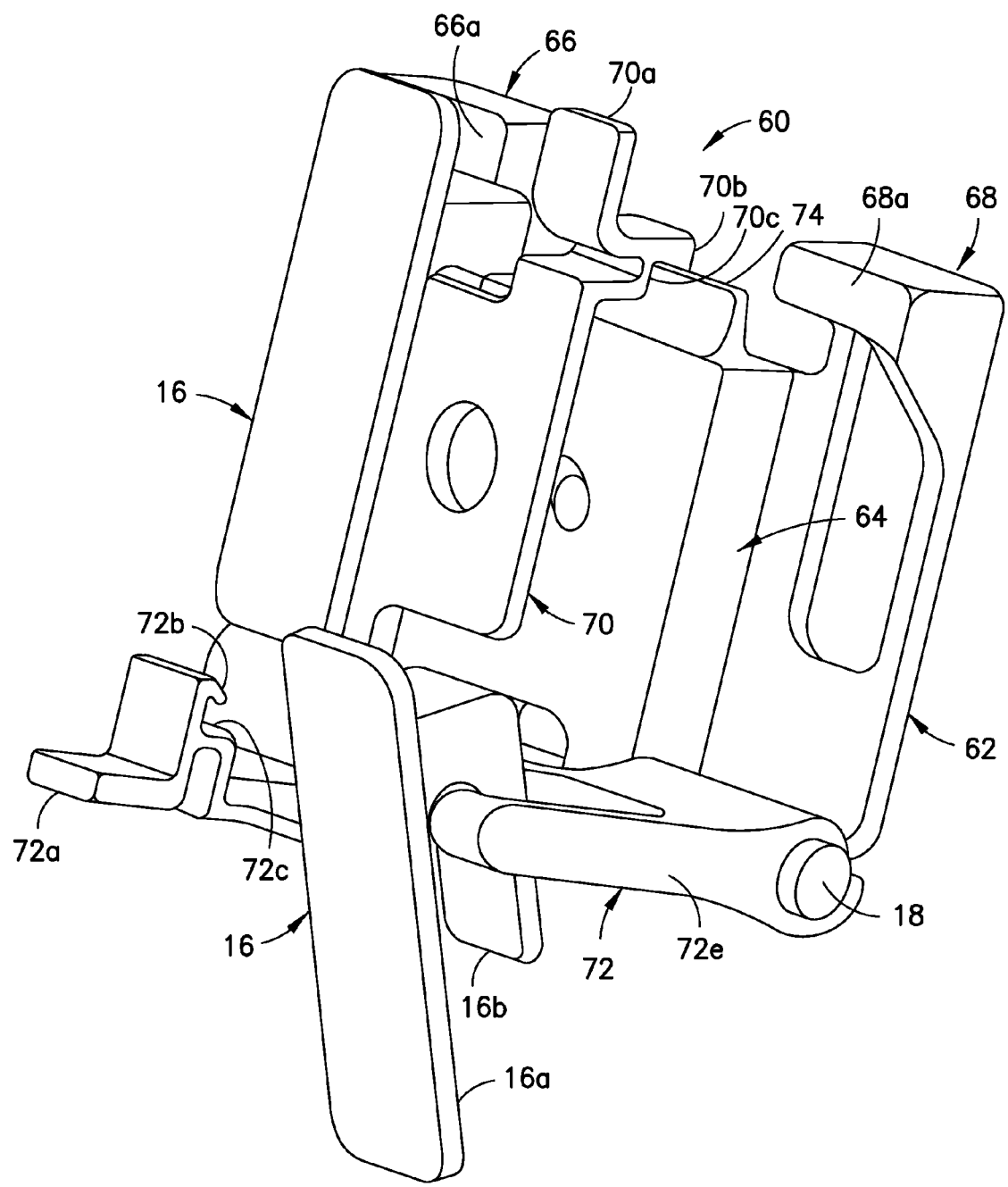
FIGS. 16 and 17 are diagrams representing respective isometric views of a locating snap latch assembly in accordance with a fourth embodiment in which the unlatch feature has an alternative configuration. Again one retainer is shown in its latched state and the other retainer is shown in its unlatched state. Both retainers are shown with respective panel clips hooked thereon.
Figure 17:
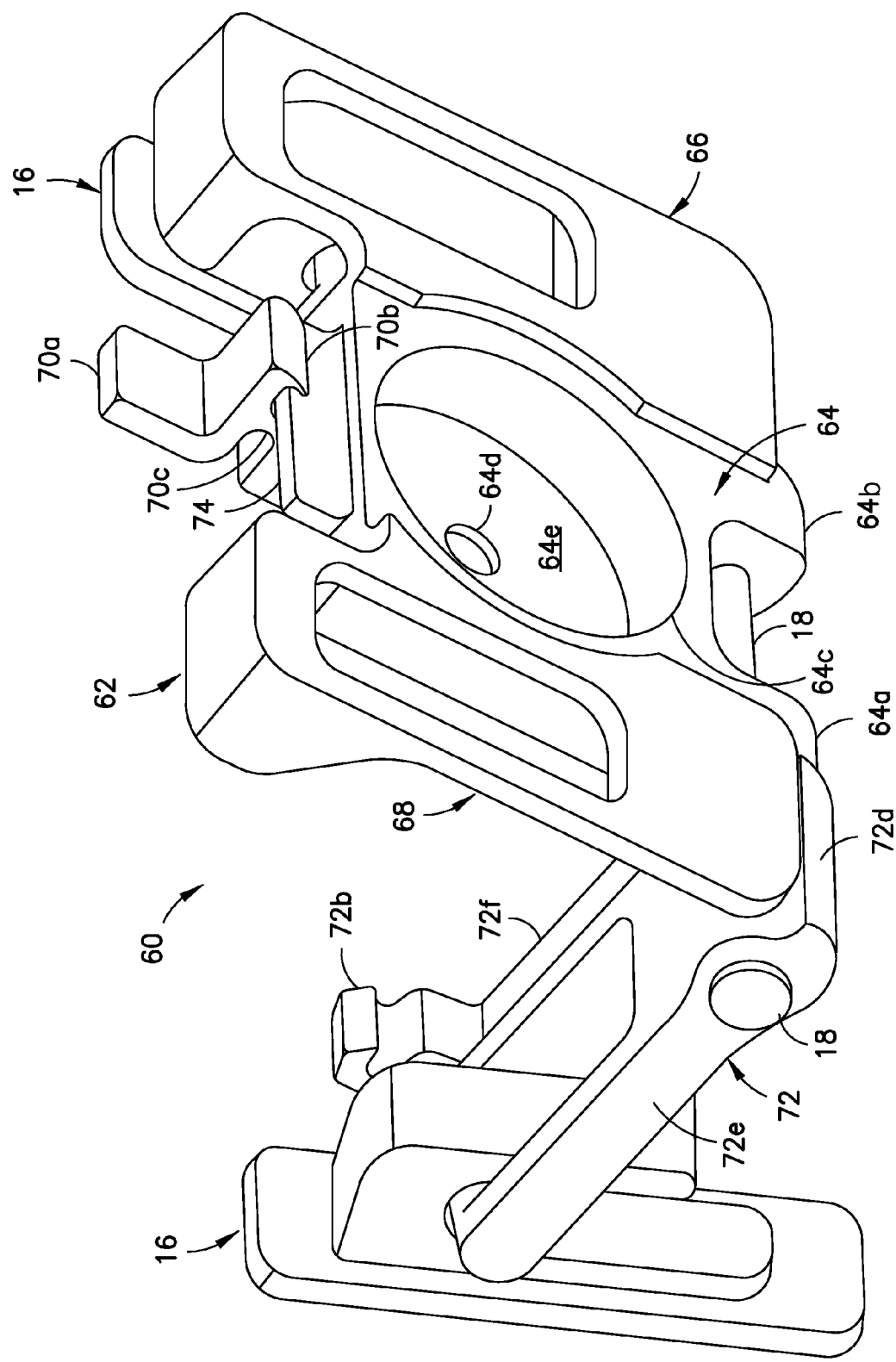

FIGS. 16 and 17 are diagrams representing respective isometric views of a locating snap latch assembly 60 in accordance with a fourth embodiment in which the two retainers 70, 72 have an alternative configuration. Retainer 70 is shown in its latched state while retainer 72 is shown in an unlatched state. Both retainers are shown with respective panel clips 16 hooked thereon. As will be described in more detail below, the retainers 70, 72 seen in FIGS. 16 and 17 differ from the retainers 12, 14 seen in FIG. 14 in two respects: (1) retainers 70, 72 each have only one portion (see, e.g., portion 72d of retainer 72 in FIG. 17) that is pivotably coupled to the hinge pin 18; and (2) the latch features of retainers 70, 72 are projections 70b, 72b which are designed to interact with a projection 74 integrally formed on a bracket 62 (rather than interacting with a slot formed in the bracket, as previously described with reference to FIG. 14).

The bracket 62 comprises a central portion 64 and a pair of locating elements 66, 68 which are integrally formed with and connected to opposing sidewalls of the central portion 64. The bracket 62 may have a structure which is similar to the structure of bracket 52 depicted in FIG. 14, except that the latching feature is a projection 74 (instead of a slot) and the shape of the cavity 64c (see FIG. 17) for receiving a shock mount is circular (instead of rectangular). As best seen in FIG. 17, the central portion 64 of bracket 62 has a cavity 64c for receiving a shock mount (not shown) and further has an opening 64d in its front wall 64e for receiving a bolt (not shown) for fastening the shock mount and bracket 62 to a front wall of a frame (not shown in FIGS. 16 and 17), as previously described with reference to FIG. 11. The locating elements 66, 68 may be the same as locating elements 56, 58 previously described with reference to FIG. 14 and perform the same function.

For the purpose of further describing locating snap latch assembly 60 depicted in FIGS. 16 and 17, the convention will be adopted that hinge pin 18 comprises first through fifth axial sections disposed in sequence from one end of hinge pin 18 to the other. Adopting this convention, in the embodiment depicted in FIGS. 16 and 17, the central portion 64 of bracket 62 comprises a first portion 64a that is coupled to and supports the second axial portion of hinge pin 18 and a second portion 64b that is coupled to and supports the fourth axial portion of hinge pin 18 (the third axial portion of hinge pin 18, which is disposed between the second and fourth axial portions, is exposed and visible in FIG. 17). In addition, the retainers 72 and 70 have respective portions which are pivotably coupled to the first and fifth axial portions of hinge pin 18. A portion 72d of retainer 72, which is pivotably coupled to the first axial portion of hinge pin 18, is visible in FIGS. 16 and 17; the corresponding portion of retainer 70, which is pivotably coupled to the fifth axial portion of hinge pin 18, is not visible.

As previously mentioned, retainers 70, 72 having latch and unlatch features that differ from those seen in FIG. 14. The latch features of retainers 70, 72 are projections 70b, 72b which are designed to interact with a projection 74 integrally formed on the top of the central portion 64 of bracket 62. As best seen in FIG. 17, retainer 70 comprises an unlatch feature 70a, a projection 70b, and a U-shaped flexible member 70c which is integrally formed with and connected to unlatch feature 70a, projection 70b and the remainder of retainer 70. Similarly, as best seen in FIG. 16, retainer 72 comprises an unlatch feature 72a, a projection 72b, and a U-shaped flexible member 72c which is integrally formed with and connected to unlatch feature 72a, projection 72b and the remainder of retainer 72. The response of the latch and unlatch features of retainer 70 to manipulation by a technician will now be described in detail. It should be understood that the same features of retainer 72 can be manipulated in the same way.

As best seen in FIG. 17, retainer 70 is latched to bracket 62 due to the presence of projection 70b behind the projection 74. In this latched state, the projection 70b blocks rotation of retainer 70 away from bracket 62. In order for retainer 70 to move into or out of its latched state, the projection 70b should be displaced vertically to an elevation whereat projection 70b is able to clear (i.e., pass over) the top of projection 74. A technician can accomplish this by applying sufficient pulling force to bend the unlatch feature 70a rearward (manually or using a tool) relative to the rest of the retainer 70, thereby causing the upper leg of the U-shaped flexible member 70c to bend downward toward its lower leg. This in turn causes the projection 70b to swing upward to the elevation required to clear projection 74.

Optionally, the projection 70b may have an inclined surface that facilitates projection 70b passing over the top of projection 74 when projection 70b is pushed against a forward edge of projection 74 with sufficient force during latching of retainer 70. The inclined surface should be designed so that projection 70b will be deflected upward, allowing projection 70b to be pushed further toward the rear edge of projection 74 until it snap fits behind that rear edge, thereby latching retainer 70 to bracket 62. To unlatch retainer 70 later (e.g., during removal of the panel), the technician can simply pull on the unlatch feature 70a with sufficient force, as previously described. Once the projection 70b has cleared the rear edge of projection 74, the unlatch feature 70a can be pulled further, rotating the retainer 70 to an angular position corresponding to an unlatched state. Retainer 72 is shown in such an unlatched state in FIGS. 16 and 17.

In the embodiments disclosed above, a bracket, a retainer and a hinge pin form a hinged assembly which can be used in a method for attaching a panel to an element (e.g., an interior frame) of a supporting structure (e.g., an airframe). Such a method may comprise: attaching a hinged assembly having open and closed hinge states to an element of the supporting structure; bonding a clips to a panel; hooking the clip on the hinged assembly while in its open hinge state, whereby the panel is coupled to the element of the supporting structure with loose fit engagement; and then manipulating the hinged assembly so that it transforms from its open hinge state to its closed hinge state, whereby the panel is attached to the element of the supporting structure with positive snap fit engagement. In accordance with the disclosed embodiments, hooking the clip on the hinged assembly comprises hooking the clip on a pivotable portion (i.e., the retainer) of the hinged assembly, and manipulating the hinged assembly comprises causing the retainer to pivot from a first angular position whereat the hinged assembly is in its open hinge state to a second angular position whereat the hinged assembly is in its closed hinge state. The retainer may be latched to a fixed portion (e.g., a projection or an edge on the bracket) of the hinged assembly when the hinged assembly is in its second angular position. In some implementations, a projection on a flexible portion of the retainer snaps into an empty space behind the projection or edge on the bracket when the retainer reaches its second angular position.

Figure 18:
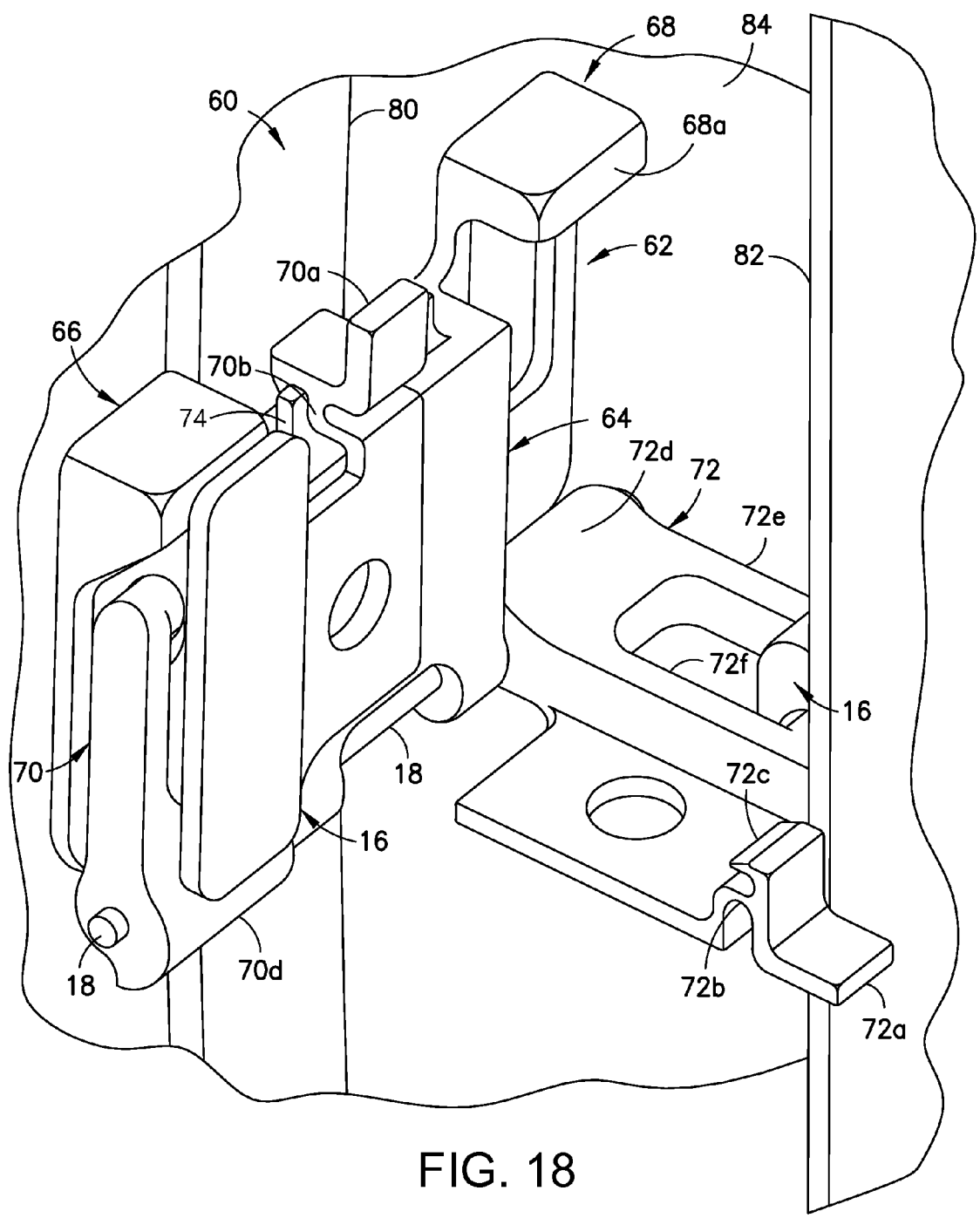
FIG. 18 is a diagram representing an isometric view of an installation comprising a locating snap latch assembly of the type depicted in FIGS. 16 and 17, the assembly being mounted to a frame and having an unlatched retainer loosely coupled to a panel clip bonded to a sidewall panel.

FIG. 18 is a diagram representing an isometric view of an installation comprising a locating snap latch assembly 60 of the type depicted in FIGS. 16 and 17. The locating snap latch assembly 60 is shown attached to a frame 80 which provides support for an outer skin 84 of a fuselage. The retainer 70 is shown in a latched state with a panel clip 16 hooked thereon, while the retainer 72 is shown in an unlatched state, also with a panel clip 16 hooked thereon. The panel clip 16 hooked on retainer 72 is bonded to the back surface of a sidewall panel 82. The sidewall panel that would be attached to the other panel clip 16 is not shown.

Figure 19:
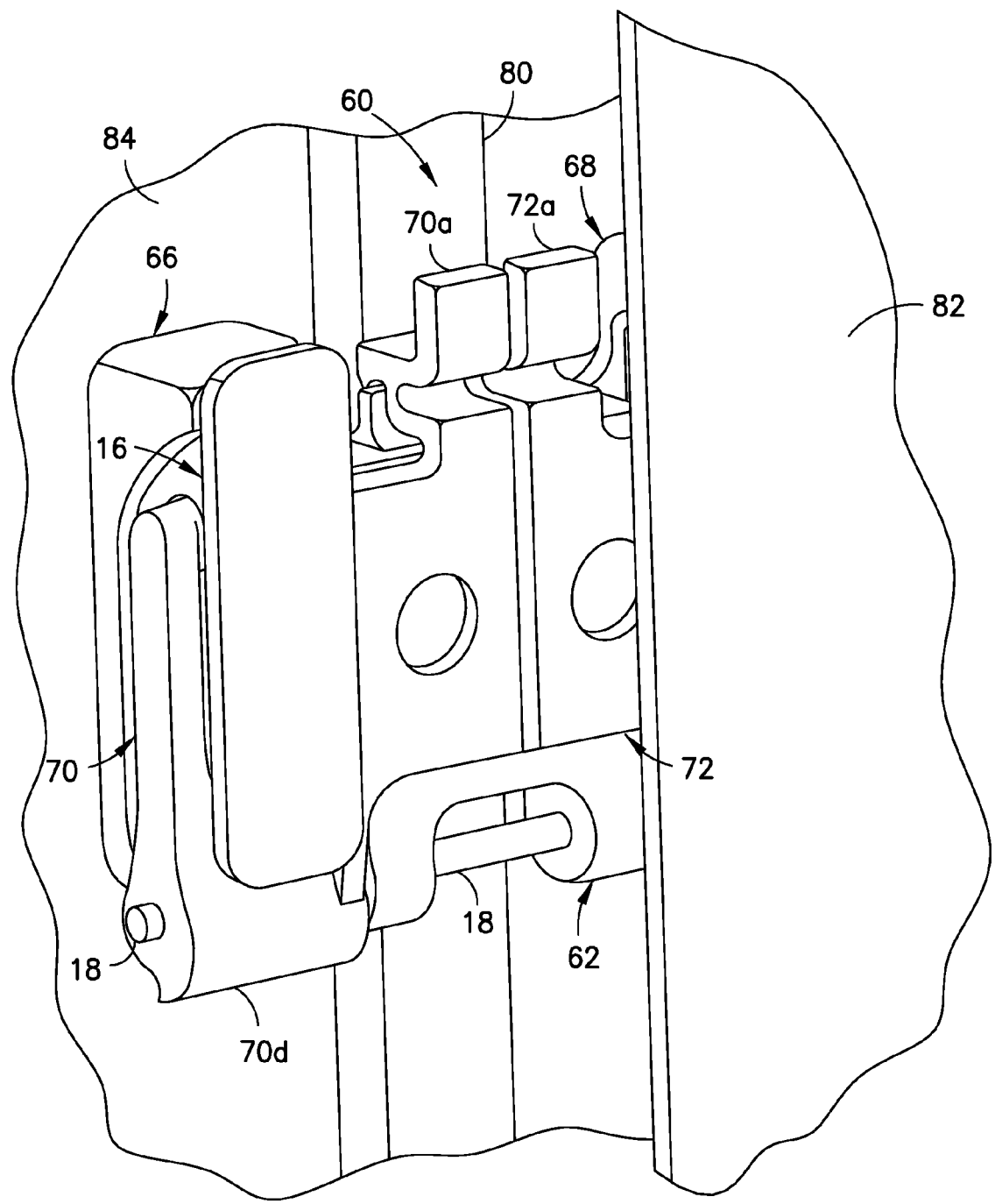
FIG. 19 is a diagram representing an isometric view of the installation depicted in FIG. 18, with the difference that the retainer coupled to the panel clip is shown in its latched state, thereby attaching the sidewall panel to the frame by positive snap fit engagement.

During installation of sidewall panel 82, a technician can manipulate the unlatch feature 72*a* of retainer 72 (manually or using a tool) to cause retainer 72 to rotate until projection 72*c* latches onto projection 74 of bracket 62. This latched state of retainer 72 is shown in FIG. 19. By repeating this procedure for all retainers having panel clips 16 coupled thereto, the sidewall panel 82 can be attached to two or more frames by positive snap fit engagement.

Each pair of adjacent sidewall panels is designed so that there is a vertical gap between the respective side edges of the sidewall panels. This gap is wide enough to allow access to the unlatch features 70*a* and 72*a*. After the sidewall panels have been installed, each gap is covered by a respective spline in a well-known manner. In the event that the aircraft operator later wishes to remove a sidewall panel (e.g., for repair), first the splines on both sides of that sidewall panel are removed. Then all of the retainers coupled to panel clips attached to that sidewall panel are unlatched. Finally, the panel clips are unhooked from the retainers, thereby freeing the sidewall panel for removal.

Figure 20:
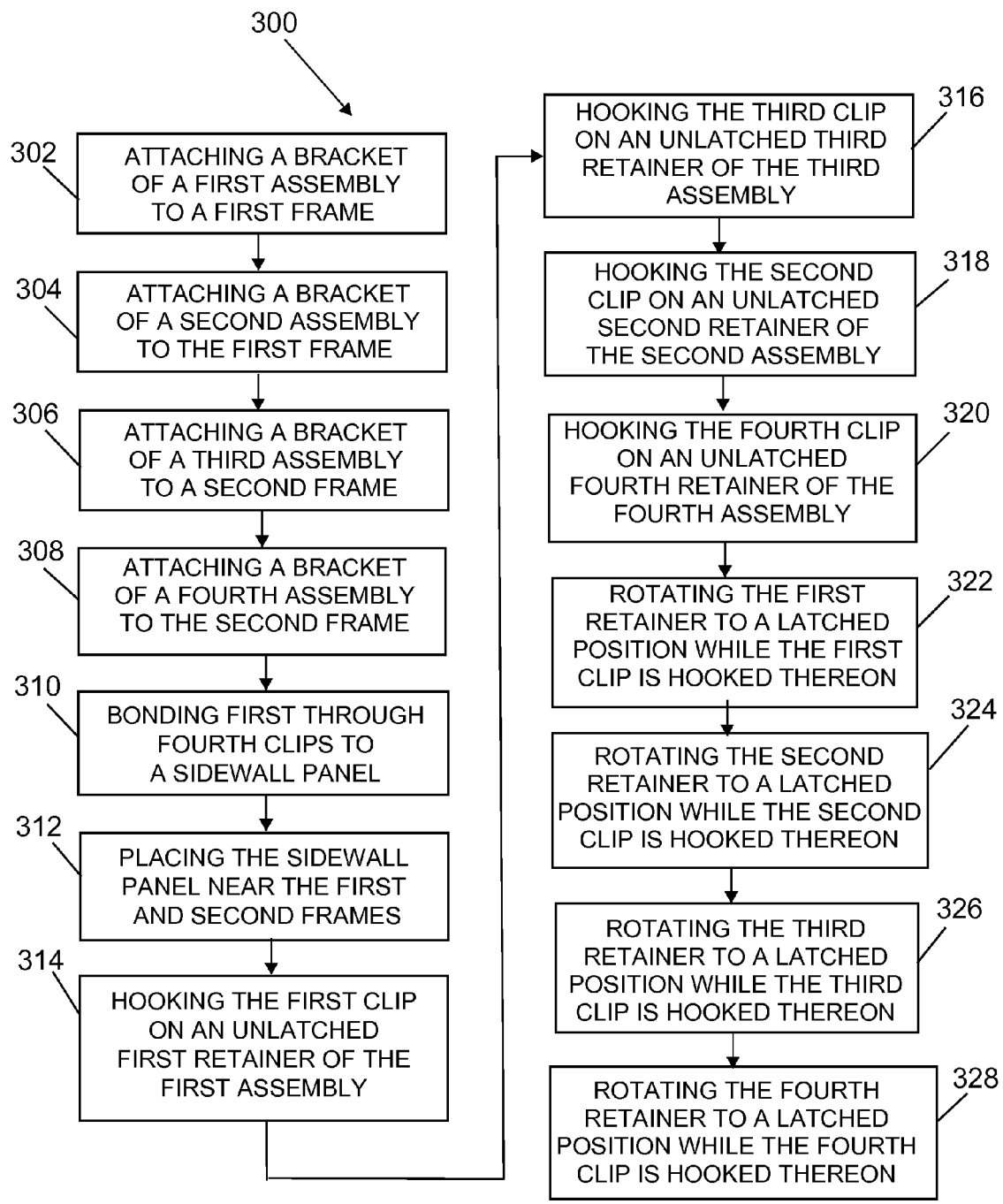
FIG. 20 is a flowchart showing steps of a method for attaching a sidewall panel to a frame in accordance with one installation methodology.

FIG. 20 is a flowchart showing steps of a method 300 for attaching a sidewall panel to a frame in accordance with one installation methodology. It should be noted that the steps of the method may be performed in other sequences than the particular sequence shown, and that the particular sequence embodied by the flowchart is merely representative. In order to configure the system, the interior cabin wall of an airframe should be prepared with all or substantially all auxiliary aircraft systems in place. Respective pluralities of snap latch assemblies may then be installed along the frames. Blocks of foam insulation may be installed in their proper places along the outer skin. When the snap latch assemblies, outer window assemblies, and blocks of foam insulation have been installed in their required positions, the sidewall panels may be hung from and then latched to the frames.

As seen in FIG. 20, the representative installation method 300 comprises the following steps. First, a first bracket of a first snap latch assembly is attached to a first frame (step 302). Then a second bracket of a second snap latch assembly is attached to the first frame at a distance from the first snap latch assembly (step 304). Next a third bracket of a third snap latch assembly is attached to a second frame (step 306). Then a fourth bracket of a fourth snap latch assembly is attached to the second frame at a distance from the third snap latch assembly (step 308). Optionally additional snap latch assemblies can be attached to each frame. The snap latch assemblies may be attached to the frames while the retainers are in either a latched or unlatched state. If they are attached while in a latched state, then the retainers must be unlatched after attachment.

Before or after the snap latch assemblies are attached to the frames, first through fourth panel clips are bonded to a back surface of the sidewall panel to be installed (step 310). The number of panel clips bonded to a panel may be greater than four. The number of snap latch assemblies attached to the first and second frames should equal the number of panel clips bonded to the sidewall panel.

After the brackets have been attached to the first and second frames and the clips have been bonded to the sidewall panel, the sidewall panel is placed adjacent to the first and second frames (step 312). To begin, the technician may adjust the position of the sidewall panel such that the first panel clip is adjacent to an unlatched first retainer of the first snap latch assembly. Then the first panel clip is hooked onto the unlatched first retainer (step 314). Then the technician may readjust the position of the sidewall panel such that the third panel clip is adjacent to an unlatched third retainer of the third snap latch assembly. Then the third panel clip is hooked onto the unlatched third retainer (step 316). Thereafter the second panel clip can be hooked onto an unlatched second retainer of the second snap latch assembly (step 318) and the fourth panel clip can be hooked onto an unlatched fourth retainer of the fourth snap latch assembly (step 320). After all of the panel clips on the back of the sidewall panel have been hooked onto respective unlatched retainers, typically the sidewall panel will be hanging from retainers at an elevation above the cabin floor.

To complete the installation process, the technician may rotate the first retainer with the first panel clip hooked thereon until the first retainer latches onto the first bracket of the first snap latch assembly (step 322); rotate the second retainer with the second panel clip hooked thereon until the second retainer latches onto the second bracket of the second snap latch assembly (step 324); rotate the third retainer with the third panel clip hooked thereon until the third retainer latches onto the third bracket of the third snap latch assembly (step 326); and rotate the fourth retainer with the fourth panel clip hooked thereon until the fourth retainer latches onto the fourth bracket of the fourth snap latch assembly (step 328). After a pair of adjacent sidewall panels have been installed in the foregoing manner, the gap between those panels can be covered by sliding a spline into position, such that the spline engages respective rails on the backs of the panels.

Thus a panel installation methodology has been described which does not require use of tooling. The disclosed components synergistically provide a maintainable system that is easily assembled, installed, and disassembled for routine maintenance.

While apparatus and methods have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

As used in the claims, the verb "to attach" should be construed broadly to cover both direct attachment without shock mounts and indirect attachment using shock mounts. In the latter case, the shock mounts may prevent the two attached parts (e.g., a bracket and a frame) from touching.

The invention claimed is:

1. A method for attaching a panel to a supporting structure that supports a wall, comprising:
   attaching a first hinged assembly having open and closed hinge states to a first element of the supporting structure;
   attaching a second hinged assembly having open and closed hinge states to a second element of the supporting structure;
   bonding first and second clips to first and second portions of the panel;
   hooking the first and second clips on the first and second hinged assemblies respectively while the first and second hinged assemblies are in their respective open hinge states, whereby the first and second portions of the panel are respectively loosely coupled to the first and second elements of the supporting structure in an unlocked state; and manipulating the first and second hinged assemblies so that their respective states transform from their respective open hinge states to their respective closed hinge states, whereby the first and second portions of the panel are respectively attached to the first and second elements of the supporting structure with positive snap fit engagement in a locked state.

2. The method as recited in claim 1, further comprising:

attaching a third hinged assembly having open and closed hinge states to the first element of the supporting structure;

attaching a fourth hinged assembly having open and closed hinge states to the second element of the supporting structure;

bonding third and fourth clips to third and fourth portions of the panel;

hooking the third and fourth clips of the third and fourth hinged assemblies respectively while the third and fourth hinged assemblies are in their respective open hinge states, whereby the third and fourth portions of the panel are respectively loosely coupled to the first and second elements of the supporting structure in an unlocked state; and manipulating the third and fourth hinged assemblies so that their respective states transform from their respective open hinge states to their respective closed hinge states, whereby the third and fourth portions of the panel are respectively attached to the first and second elements of the supporting structure with positive snap fit engagement in a locked state.

3. The method as recited in claim 1, wherein hooking the first clip on the first hinged assembly comprises hooking the first clip on a pivotable portion of the first hinged assembly, and manipulating the first hinged assembly comprises causing the pivotable portion of the first hinged assembly to pivot from a first angular position whereat the first hinged assembly is in its open hinge state to a second angular position whereat the first hinged assembly is in its closed hinge state.

4. The method as recited in claim 3, wherein the pivotable portion of the first hinged assembly is latched to a fixed portion of the first hinged assembly when the first hinged assembly is in its second angular position.

5. The method as recited in claim 3, wherein a projection on a flexible portion of the pivotable portion of the first hinged assembly snaps into an empty space bounded by an edge of a fixed portion of the first hinged assembly when the pivotable portion of the first hinged assembly reaches its second angular position.

6. The method as recited in claim 1, wherein the first and second elements of the supporting structure are respective interior frames of an aircraft fuselage and the panel is an interior sidewall panel.

7. An assembly comprising:

a hinge pin comprising first and second axial portions;

a bracket comprising a first portion that supports said first axial portion of said hinge pin and a second portion connected to said first portion and disposed at a distance from said hinge pin; and a first retainer comprising a first proximal portion which is pivotably coupled to said second axial portion of said hinge pin, and first and second distal portions which move along respective arcs when said first retainer is rotated about said hinge pin, wherein said first distal portion of said first retainer comprises a catch bar and said second distal portion of said first retainer comprises a latch feature which latches to said second portion of said bracket when said first retainer rotates to a predetermined angular position relative to said bracket.

8. The assembly as recited in claim 7, wherein said latch feature of said first retainer comprises a projection which overrides said second portion of said bracket and then enters an empty space bounded by an edge of said second portion of said bracket while said first retainer is rotating into said predetermined angular position relative to said bracket.

9. The assembly as recited in claim 8, wherein said second portion of said bracket comprises a slot configured to receive said projection of said first retainer.

10. The assembly as recited in claim 8, wherein said second portion of said bracket comprises a projection configured to engage said projection of said first retainer.

11. The assembly as recited in claim 8, wherein said second distal portion of said first retainer further comprises an unlatch feature capable of lifting said projection of said first retainer out of said empty space in response to a force being applied to said unlatch feature while said first retainer is latched to said bracket.

12. The assembly as recited in claim 7, wherein said hinge pin further comprises a third axial portion, said first axial portion of said hinge pin being disposed between said second and third axial portions, and said first retainer further comprises a second proximal portion which is pivotably coupled to said third axial portion of said hinge pin.

13. The assembly as recited in claim 12, wherein said hinge pin further comprises a third axial portion, said first axial portion of said hinge pin being disposed between said second and third axial portions, said assembly further comprising:

a second retainer comprising a proximal portion which is pivotably coupled to said third axial portion of said hinge pin, and first and second distal portions which move along respective arcs when said second retainer is rotated about said hinge pin, wherein said first distal portion of said second retainer comprises a catch bar and said second distal portion of said second retainer comprises a latch feature which latches to said second portion of said bracket when said second retainer rotates to a predetermined angular position relative to said bracket.

14. A system comprising:

a supporting structure comprising first and second elements;

a wall supported by said first and second elements of the supporting structure;

a first assembly comprising a first bracket attached to said first element of the supporting structure, a first hinge pin, and a first retainer which is pivotably coupled to said first bracket by said first hinge pin, said first retainer being rotatable between a first angular position at which said first retainer is not latched to said first bracket and a second angular position at which said first retainer is latched to said first bracket;

a second assembly comprising a second bracket attached to said second element of the supporting structure, a second hinge pin, and a second retainer which is pivotably coupled to said second bracket by said second hinge pin, said second retainer being rotatable between a first angular position at which said second retainer is not latched to said second bracket and a second angular position at which said second retainer is latched to said second bracket;

a panel; and first and second clips attached to said panel and respectively coupled to said first and second retainers, wherein said first and second elements of the supporting structure are disposed between said wall and said panel.

15. The system as recited in claim 14, wherein said first retainer comprises a first catch bar, said second retainer comprises a second catch bar, said first clip is hooked on said first catch bar, and said second clip is hooked on said second catch bar.

16. The system as recited in claim 15, wherein said first bracket further comprises a first locating element which blocks upward movement of said first clip when said first retainer is latched to said first bracket, and said second bracket further comprises a second locating element which blocks upward movement of said second clip when said second retainer is latched to said second bracket.

17. The system as recited in claim 14, wherein:

said first retainer comprises a first projection which overrides a portion of said first bracket and then enters a first empty space bounded by an edge of said portion of said first bracket as said first retainer rotates into an angular position corresponding to a latched state of said first retainer; and said second retainer comprises a second projection which overrides a portion of said second bracket and then enters a second empty space bounded by an edge of said portion of said second bracket as said second retainer rotates into an angular position corresponding to a latched state of said second retainer.

18. The system as recited in claim 17, wherein:

said first retainer further comprises a first unlatch feature capable of lifting said first projection out of said first empty space in response to a force being applied to said first unlatch feature while said first retainer is in its latched state; and said second retainer further comprises a second unlatch feature capable of lifting said second projection out of said second empty space in response to a force being applied to said second unlatch feature while said second retainer is in its latched state.

19. The system as recited in claim 14, wherein said first and second elements of the supporting structure are respective interior frames of an aircraft fuselage, said wall is an outer skin of the aircraft fuselage, and the panel is an interior sidewall panel.

* * * * *